United States Patent [19]

Blenkarn

[11] E Re. 30,590

[45] Reissued Apr. 28, 1981

[54] VERTICALLY MOORED PLATFORM

[75] Inventor: Kenneth A. Blenkarn, Tulsa, Okla.

[73] Assignee: Standard Oil Company (Indiana), Chicago, Ill.

[21] Appl. No.: 34,318

[22] Filed: Apr. 30, 1979

Related U.S. Patent Documents

Reissue of:

[64] Patent No.: 3,648,638
Issued: Mar. 14, 1972
Appl. No.: 17,485
Filed: Mar. 9, 1970

U.S. Applications:

[63] Continuation-in-part of Ser. No. 754,628, Aug. 28, 1968, abandoned.

[51] Int. Cl.[3] ..... B63B 35/00; B63B 35/44

[52] U.S. Cl. ..... 114/265; 405/202

[58] Field of Search ..... 114/265, 264, 293; 405/203, 224, 225, 202; 175/7

[56] References Cited

U.S. PATENT DOCUMENTS

| | | | |
|---|---|---|---|
| 2,399,656 | 5/1946 | Armstrong | 114/265 |
| 2,939,291 | 6/1960 | Schurman et al. | 114/265 |
| 3,154,039 | 10/1964 | Knapp | 114/265 |
| 3,163,220 | 12/1964 | Haeber | 175/7 X |
| 3,224,401 | 12/1965 | Kobus | 114/265 |
| 3,327,780 | 6/1967 | Knapp et al. | 114/265 X |

*Primary Examiner*—Sherman D. Basinger
*Attorney, Agent, or Firm*—John D. Gassett

[57] ABSTRACT

This invention relates to a structure floating on a body of water. Three or more spar buoy-type floats support the structure above the water. The structure is connected to anchors in the floor of the body of water by [elongated members such as] large diameter pipe *for example*. There are no other anchoring connections in the system. Each spar buoy has a unique structure so that vertical forces and overturning moments on the floating structure are minimized. [The spar buoys have a buoyancy means having a volume of two parts.] *The buoy of each spar buoy has a volume of two parts.* The first part can be defined as resulting from a straight, vertical, prismatic shape which runs the entire vertical length of the [buoyancy means.] *buoy*. The volume of this prismatic portion comprises between about 40 and 80 percent of the total displacement. The [buoyancy means have a second or] *second part has an* auxiliary volume of displacement which runs considerably less than the vertical length of the prismatic portion. This critical arrangement of buoyancy between these two parts as taught in this invention minimizes mooring forces imposed on the vertical elongated members, such as occur to react forces on the structure due to passing waves.

62 Claims, 40 Drawing Figures

VARIATION OF NET VERTICAL FORCE (% DISPL.)
.30
.20
.10
0
-.10
-.20
-.30
51.2 FT, 10 SEC. WAVE
100 FT, 14 SEC. WAVE
100 FT, 20 SEC. WAVE

100 FT, 20 SEC. WAVE
100 FT, 14 SEC. WAVE
51.2 FT, 10 SEC. WAVE 51.2 FT, 10 SEC. WAVE
+0.071
100 FT, 14 SEC. WAVE
100 FT, 20 SEC. WAVE
-0.071

FOLLOWING CREST
TROUGH
LEADING CREST
CREST
FOLLOWING CREST

P
r
0.9
0.8
0.7
0.6
0.5
0.4
0.3
0.2
0.1
0
0.5
1.0
1.5
2.0
2.5
3.0
$\left(\frac{|\Delta T|_{MAX}}{b}\right)$=.22
.20
.20
.18
.16
.16
.18
.22
0.3=$\left(L/H\right)$
0.4
0.5
MAXIMUM DESIGN WAVE HEIGHT=100 FT.
LEG SPACING=160 FT.
DRAFT=100 FT.
TOTAL DISPLACEMENT=28,675 kips
PLATFORM MASS=18,675 kips
TOTAL MOORING FORCE=10,000 kips L/H
r
0.7
0.6
0.5
0.4
0.3
0.2
0.1
0
0.5
1.0
1.5
2.0
2.5
3.0
$\left(\frac{L}{H}\right)=1-\frac{1}{2}\left(\frac{h_{MAX}}{H}\right)$
.22
.20
.18
.16
.22=$\left(\frac{|\Delta T|_{MAX}}{b}\right)$
.20
.18

VERTICALLY MOORED PLATFORM

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part application of copending application Ser. No. 754,628, entitled "Vertically Moored Platforms," filed Aug. 28, 1968, Kenneth A. Blenkarn and now abandoned.

BACKGROUND OF THE INVENTION

1. Field of the Invention

This invention relates to a structure floating on a body of water. More particularly, the invention relates to a floating structure from which drilling or production operations are carried out. In its more specific aspects, the invention concerns a floating structure having buoyancy means placed especially with respect to the trough of a design wave so as to minimize mooring forces imposed on the vertical elongated members which anchor the structure, such as those forces which may be caused by passing waves.

2. Setting of the Invention

In recent years there has been considerable attention attracted to the drilling and production of wells located in water. Wells may be drilled in the ocean floor from either fixed platforms in relatively shallow water or from floating structures or vessels in deeper water. The most common means of anchoring fixed platforms include the driving or otherwise anchoring of long piles in the ocean floor. Such piles extend above the surface of the water with a support or platform attached to the top of the piles. This works fairly well in shallower water, but as the water gets deeper, the problems of design and accompanying costs become prohibitive. In deeper water it is common practice to drill from a floating structure.

In recent years there has been some attention directed toward many different kinds of floating structures, for the most part maintained on station by conventional spread catenary mooring lines, or by propulsion thruster units. One scheme recently receiving attention for mooring is employed in the so-called vertically moored platform. One such platform is described in U.S. Pat. No. 3,154,039, issued Oct. 27, 1964. A key feature of the disclosure in the patent is that the floating platform is connected to an anchor base only by elongated parallel members. The members there are held in tension by excess buoyancy of the platform. This feature offers a remedy for one of the major problems arising in the conduct of drilling, or like operations from a floating structure. This major problem is that ordinary hull-type barges or vessels, in response to ocean waves, may exhibit substantial amounts of vertical heave and angular roll motion. Such motions significantly hinder drilling operations. Motion difficulties are alleviated to a degree by use of the so-called semisubmersible vessels or structures in which flotation buoyancy is provided by long, slender vertical bottles or tanks. This design suffers the inconvenience that, if carried to the logical extreme of having very little waterplane area, the unit would become statically unstable, requiring careful reballasting to offset changes in vertical loads, such as drilling hook load (e.g., when pulling drill pipe, etc.) or changes in weight of supplies. Some of those problems are eliminated or at least reduced in the vertically moored platform. Being subjected to tension, the elongated parallel members of the vertically moored platform are substantially inextensible and therefore restrain the platform to move primarily in the horizontal direction. This virtually eliminates heave and roll motions. In vertically moored structures heretofore considered, exceptionally strong mooring would be required to resist the vertical forces which might be imposed upon a structure by the orbital motion of passing waves. The present invention describes a means to minimize the mooring forces imposed by the structure on the elongated members, such as those caused by passing waves.

BRIEF DESCRIPTION OF THE INVENTION

Briefly, a preferred embodiment of this invention concerns a floating structure having limited lateral movement for use in a body of water. It is especially designed for an expected maximum wave. This expected wave is usually called the "maximum design wave." The structure includes a working platform supported by a buoyancy means comprising a plurality of slender vertical float members. The float members are rigidly anchored to the ocean floor by a plurality of horizontally spaced-apart, parallel, elongated members. The volume of the buoyancy means can be defined as comprising two parts, the first part resulting from a straight, vertical, prismatic shape which runs the entire vertical length of each vertical float member. The volume of the prismatic portion comprises from about 40 percent to about 80 percent of the total displacement of the buoyancy means below the "still water" line. The ratio of the displacement of the prismatic portion to the total displacement is called the prismatic ratio p. A second volume of displacement surrounds the prismatic portion and comprises the remainder of the total displacement. This second volume is placed below the trough of the design wave. This critical placement of the second or auxiliary volume and the critical size minimizes the critical mooring forces imposed on the vertical elongated members by the structure due to the orbital motion of the passing waves.

Various objects and a better understanding of the invention can be had from the following description taken in conjunction with the drawings.

DESCRIPTION OF THE DRAWINGS

FIGS. 15A through 23A illustrate (a) the best combinations of shape parameters r and (L/H) and (b) the range of practical combinations of these parameters for various platform sizes and design conditions, as noted;

FIGS. 15B through 23B illustrate (a) the best combinations of shape parameters p and r and (b) the range of practical combinations of these parameters for various platform sizes and design conditions, as noted.

Figure 1:
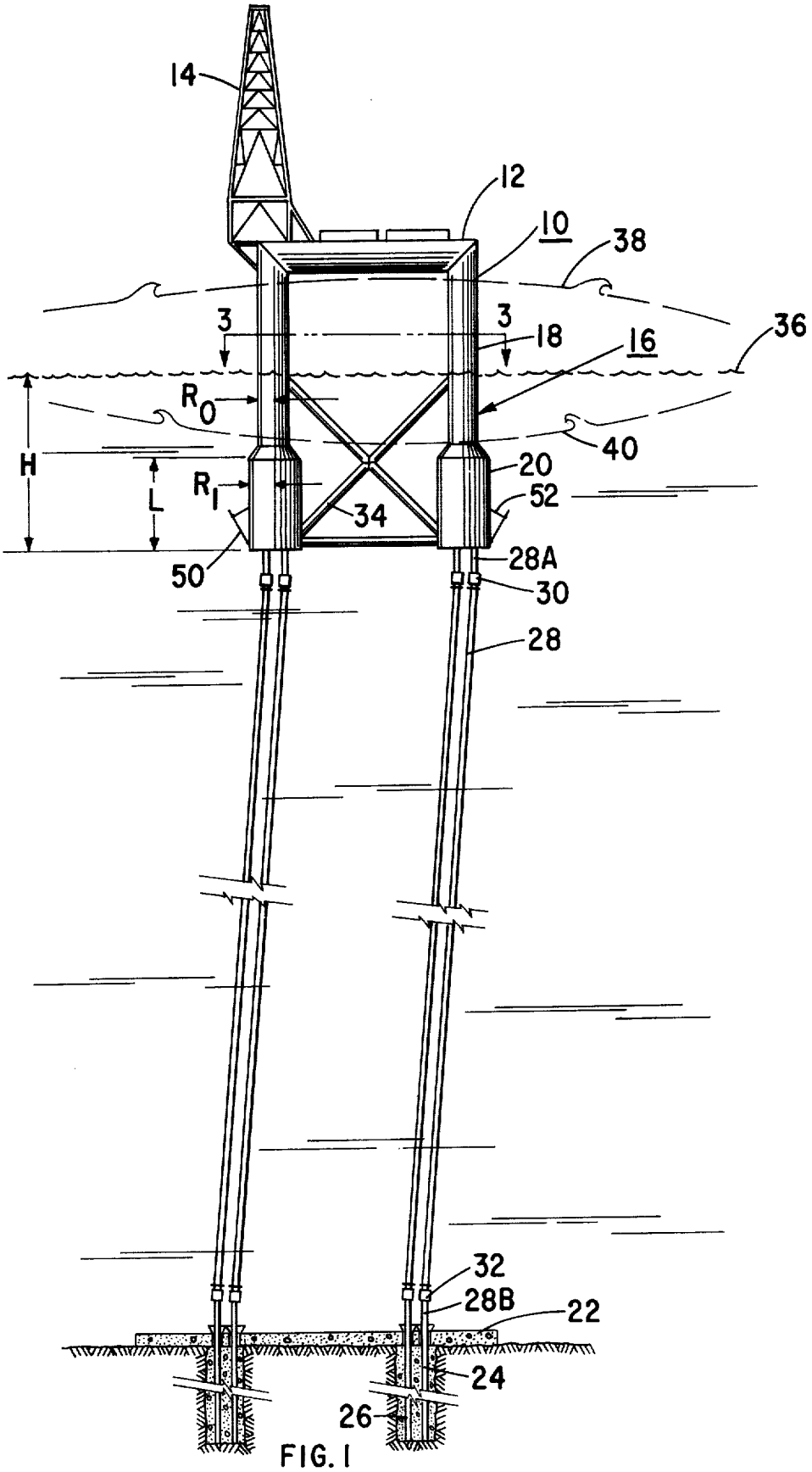
FIG. 1 is a view of a floating structure of this invention.

Referring to the drawings in which identical numbers are employed to identify identical parts, numeral 10 designates, generally, the floating structure or platform. The floating structure 10 includes a deck portion 12 which may have a derrick 14 mounted thereon. The deck 12 is preferably an enclosed space where quarters, workshop area, etc., are located. This is to aid in streamlining the system. Various auxiliary means, including a port for helicopter, etc., may be provided.

Figure 3:
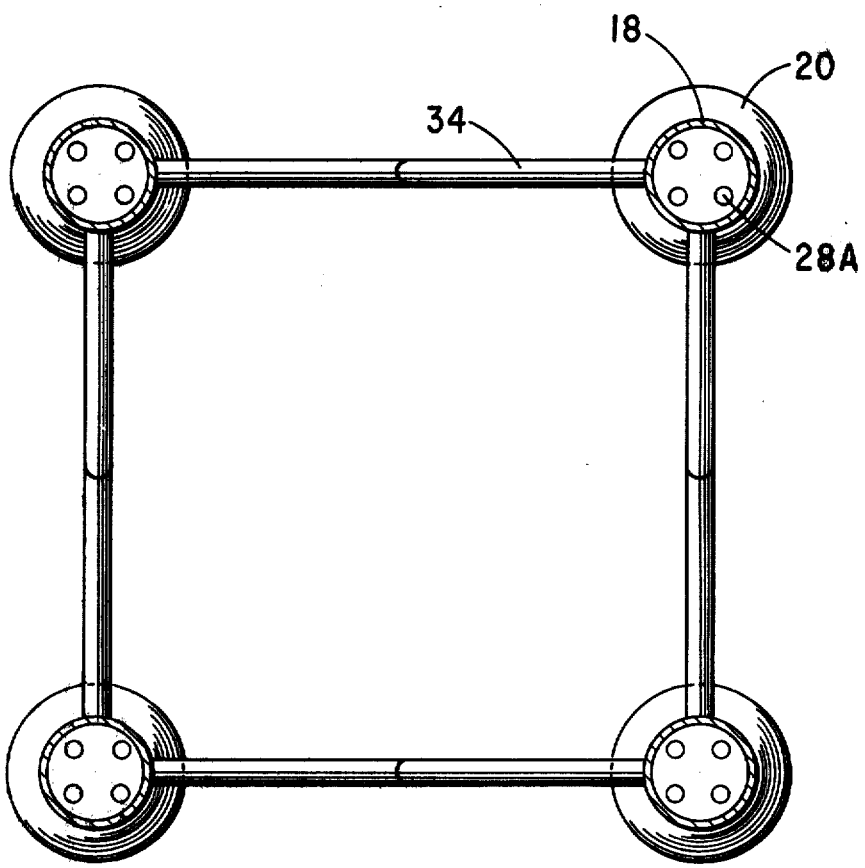
FIG. 3 is a section taken along the line 3—3 of FIG. 1.

The deck 12 is supported by at least three vertical float means, generally designated by the numeral 16. This includes an upper "skinny" portion 18 and a lower "fat" portion 20. There are enough of these vertical support means 16 to provide stability. This would ordinarily be three or more. There are four shown as indicated in FIG. 3. The size and placement of the lower portion 20 of the float will be discussed later.

The platform is anchored by suitable means to the ocean floor. Shown in the drawing is a baseplate 22. Anchor piles 24 extend into the bottom of the ocean for whatever depth is needed to secure the proper anchorage, e.g., 500 feet. These anchor members are secured in place, for example, by cement 26. Connecting anchor members 24 to the working structure or platform are a plurality of elongated member 28 alternately called risers. These elongated members 28 are preferably large-diameter steel pipe, e.g., 20 to 30 inches in diameter. These elongated members 28 could be cables of wire, chain, and the like. However, it is preferred that they be pipe so that operations can be conducted from the floating structure down through them to underground formations. Preferably, it is desired to drill down through these pipes.

The structure shown in FIG. 1 is essentially rigid in the vertical direction, but is relatively free to move in the horizontal direction. Restraint against horizontal movement is only the horizontal component of riser tension, that component being proportional to the angular departure of the riser from true vertical. Under the action of wind, current and other steady forces, the platform will be shifted horizontally until the resultant horizontal restraint equals such applied loads. In response to wave action the platform will oscillate back and forth about the shifted or average position. The platform will, for storm wave situations, generally oscillate horizontally so as to move with the surrounding fluid. The horizontal motion of the platform will basically satisfy the following relation.

$$X = A' \frac{H' + B}{H' + M} \frac{[T_n/T]^2}{[T_n/T]^2 - 1} \tag{1}$$

in which

X = the single amplitude horizontal motion of the platform.

A' = the horizontal, single amplitude wave motion of water at the elevation of the platform center of buoyancy. See Equation (2).

B = the buoyancy or displacement of the platform.

H' = the "hydrodynamic mass" of water associated with acceleration of the platform. For most configurations H' is essentially equal to buoyancy.

M = the actual weight of the platform.

T = the wave period.

$T_n$ = the natural sway period, calculated from Equation (3). Water motion A' is calculated, for simple wave theories, according to the following equation.

$$A' = \frac{h}{2} e^{-2\pi S/\lambda} \tag{2}$$

in which h = wave height, crest to trough.

S = the submergence of the platform center of buoyancy below still water level.

λ = wave length (= $5.12T^2$, by Airy Theory).

Natural sway period of the platform is expressed as (3)

$T_n^2 = L' (H' + M)/B - M$ in which

L' = the length of vertical mooring lines or risers, and other symbols are as previously defined.

For most platform configurations of interest, a design wave 100 feet high would cause the platform to move 50 feet either side of the average shifted position. It is generally to be preferred that steady storm shift of the platform be approximately equal to the single amplitude of the wave induced motion. For the case just described, an appropriate design shift would be 50 feet. For water depth requiring vertical risers 1,000 feet long, such a horizontal shift would correspond to a horizontal restraint equal to 1/20 of the tension in the vertical mooring lines or risers. Thus, tension in the risers should generally be between 15 and 25 times the steady horizontal storm loads. Typically required total tensions in the order of 10,000,000 pounds are to be expected. Typically such a tension could be carried by 16 or 20 pipe risers which have 20 inches outside diameter with a wall thickness of 0.625 inches.

It has been found that when pipes such as risers 28 are under tension and subject to angular rotation, the influence of tension is to concentrate the angular rotation at the ends of the pipe. Accordingly, means are provided in risers 28 to permit this angular rotation with the two terminals of the riser pipe 28. This is provided in the form of a ball joint 30 at the upper end and a ball joint 32 at the lower end.

Another means of providing for the excess stresses which would be built up near the ends of pipe 28 if they were not hinged, is to provide a section of special size and wall thicknesses at the end of the pipe to make them sufficiently strong to withstand the imposed stresses. Other suitable means for limiting this concentration of stress are described in the copending patent application of Blenkarn and Dixon, Ser. No. 748,867 filed July 30, 1968, *now U.S. Pat. No. 3,559,410*. The vertical members 16 are connected by cross bracing 34. This cross bracing is preferably all located below the still waterline indicated by line 36. As mentioned earlier, this structure will be subjected to various wave forces. In Naval engineering, when designing floating structures, or other marine structures for that matter, it is quite common to select what is known as a maximum design wave. The maximum design wave will have a crest 38 and a trough 40.

There are concepts disclosed herein which teach the means by which the mooring forces are minimized when using the invention as exemplified by the embodiment of FIG. 1. A particularly desirable shape for the vertically positioned elongated floats is illustrated in FIG. 1. With reference to such a shape, the following applies. The volume of buoyancy or displacement can be conceived as being made up of two parts. The first part results from a straight, vertical, prismatic shape which has the diameter of upper portion 13 and runs the entire vertical length of the structure. The volume of this prismatic portion of the structure comprises between about 40 percent and about 80 percent of the total displacement. The second or auxiliary volume of displacement is that part which is the annulus volume between the prismatic volume and the inner wall of enlarged portion 20. This auxiliary volume is placed below trough 40 of the maximum design wave.

The auxiliary volume should be placed in a smooth and streamlined fashion, as indicated above, as an annular space around the basic prismatic volume. The size of the auxiliary volume in the annulus portion of the "bottles" should be reduced to the extent of displacement provided by the bracing 34 within the structure which is below the trough of the design wave. The auxiliary volume in the annular space should be streamlined and flared into the basic prismatic volume to the extent practical. While I have discussed a prismatic volume and an auxiliary volume, it is to be understood that these two volumes can be continuous and that it is not necessary that they be separated into physical compartments.

If a vertically moored platform is to be used, it is usually necessary that variations of vertical mooring forces, which arise in reaction to forces imposed on the structure by wave action, be minimized within the range of wavelengths of importance. Wavelengths of importance vary from one wave area to another but many are typically in the range of from about 500 ft. to 2,000 ft. Wave action on the structure results in (a) a net vertical force on the structure, (b) a net couple on the structure due to vertical forces on individual bottles, and (c) a net overturning moment on the structure due to horizontal wave forces. All of these forces contribute to the variation in mooring force.

The structures of my invention minimize the variation in mooring force, for the range of wave lengths of importance, by permitting offsetting contribution from each of the contributing factors: net vertical force, net couple of vertical forces and net overturning moment. If I did not use the structure of my invention to obtain proper distribution, one of these forces might be overpowering. For example, if vertical forces on individual bottles are eliminated or minimized, thereby eliminating or minimizing the net vertical forces and the net couple due to vertical force on the structure, the variation in mooring force is due entirely to overturning moment and can be undesirably large, especially for the longer wavelengths. On the other hand, if the buoyancy arrangement is such that a small amount of net vertical force is admissible for all wavelengths, there is a phenomenon associated with this force, the net coupling of vertical forces, which causes a net reduction in overturning moments at the larger wavelengths. Therefore, a careful selection of buoyancy distribution can result in a minimization of mooring force variations over the entire range of important wavelengths. This I teach.

The vertical forces on the structure are dominated by forces which fall into two categories: namely, (a) variable buoyancy and (b) vertical water acceleration forces. While there are other contributions to the net vertical forces, they are of lesser importance. All of these forces on the structure were calculated by elementary, commonly understood means. However, the dominant two forces were combined for the calculations into one net force, heave, which is discussed below. The two categories of dominant vertical forces act in opposite direction to one another and one of the concepts of this invention is to carefully adjust the magnitudes of these forces to obtain the desired net vertical force. This is possible with my design for certain ratios (L/H) of the length (L) of the enlarged portion to the total design draft (H) and for certain ratios (r) of the radius $R_1$ of the enlarged portion to the radius $R_0$ of the prismatic portion for a selected draft where L, H, $R_0$ and $R_1$ are defined in FIG. 1. As shown above, the prismatic ratio "p" is defined as the ratio of the displacement of the prismatic portion to the total displacement.

I shall first consider the net vertical forces on the structure. (I shall consider the net overturning moment later and how my structure minimizes such moment.) These various net vertical forces can be calculated by using the following equation.

$$F(\eta \cdot 0) = \Delta(\eta) - \Delta(0) - kpg\eta \int_{v=0}^{\eta + H} A(\gamma)\,\phi(\gamma)\,e^{k(v-H)}d\gamma \qquad (4)$$

where:

F = net change in vertical force, positive upwards $\Delta(\eta)$ = total displacement below the instantaneous water level $\Delta(O)$=design displacement, or total displacement below design still water level k=wave decay factor, i.e., $=2\pi/\lambda$ where $\lambda$=wave length (Airy Theory)

$\rho$=water mass density g=gravitational acceleration

A(y)=cross section area (varies with depth or y)

$\phi(y)$=hydrodynamic mass coefficient and varies with depth, i.e., $\phi(y)$=mass of cylinder + added fluid mass/mass of cylinder H=design draft y=a vertical coordinate measured position upwards from the base of the buoyancy means $\eta$=a vertical coordinate measured position upwards from the design still water level to the instantaneous water surface (=Y-H). In Equation (4) terms $[\Delta(\eta)-\Delta(O)]$ give the force due to variable buoyancy, and the remaining term gives the force due to vertical water acceleration.

Figures 6A, 6B, 6C:
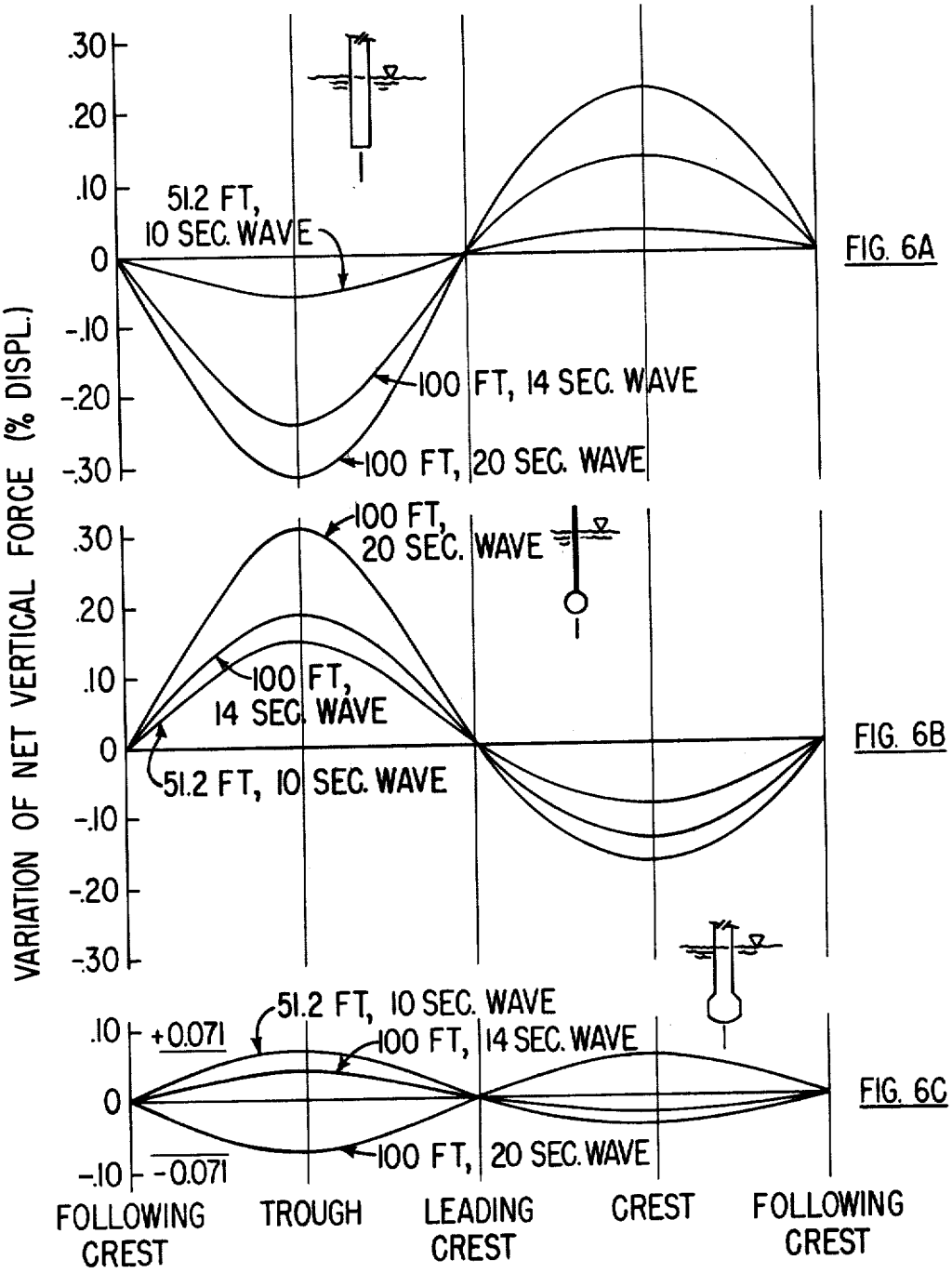
FIGS. 6A, 6B and 6C illustrate the variation in mooring force for three fundamental types of vertically moored platforms which consist respectively of only one slender, vertical float member; a float member completely submerged; and a buoyancy member according to this invention.

Consider first two very elementary types of vertically moored structures as shown in FIGS. 6A and 6B. In FIG. 6A is a buoy consisting only of one cylinder. This buoy is moored by one or more vertical tethers such that it is not free to move vertically, but it can move horizontally or rotate. The buoy does not have an annular, or auxiliary portion; all displacement is from the prismatic portion. Therefore, the prismatic ratio p which is defined as the ratio of the displacement of the prismatic portion to the total displacement, equals one (p=1). The three curves in FIG. 6A show the variation of net vertical force on the cylinder due to passage of a single wave from three different wave trains. The three wave trains have periods of 10, 14 and 20 seconds; the corresponding wave lengths are 512, 1,004 and 2,048 ft., respectively. In this example and all subsequent examples it is assumed that the wave height corresponding to each wavelength equals either one-tenth of the wavelength or the maximum design wave height, whichever is smaller. In this and most of the subsequent examples, except where noted, the maximum design wave height is 100 ft. Therefore, the corresponding wave heights for the curves in FIG. 6A are 51.2, 100 and 100 ft., respectively. The variation of net vertical forces is expressed as a percent of total displacement. For example, a 20-second wave causes a reduction in net vertical force of about 32 percent of the displacement when the wave trough is aligned at the axis of the cylindrical buoy. When the crest is aligned with the axis of the cylindrical buoy there is an increase in net vertical force of about 22 percent of the displacement. By virtue of the decrease in net vertical force at the trough and the increase at the crest, this example demonstrates that forces due to variable buoyancy are dominating for the high prismatic ratio. As an explanation of terminology, the term "leading crest" is that part of the wave halfway between the trough and the next crest. The term "following crest" is that part of the wave train at a point one-half way between the crest and the next trough.

FIG. 6B shows similar curves for another fundamental configuration of a vertically moored structure. In this case the entire displacement is contributed by a spherical cavity at the bottom of the buoy and the portion of the structure projecting upwards from the sphere has an extremely small cross section. Consequently, the prismatic portion contributes essentially nothing to the total displacement, and the annular, or auxiliary, portion contributes the entire displacement. The prismatic ratio equals zero (p=0). The curves of FIG. 6B show that the maximum variation in net vertical force is about 30 percent of the displacement in the long-period, 20-second wave. However, in this example, the vertically moored structure experiences an increase in net vertical force when the wave trough is aligned with the buoy, rather than a decrease as with the cylindrical buoy in FIG. 6A. This example demonstrates that for a low prismatic ratio the forces due to vertical water acceleration are dominating.

My invention teaches that for a low prismatic ratio, forces due to vertical water acceleration are dominating while for a high prismatic ratio, forces due to variation in buoyancy are dominating. Moreover, my invention teaches that for an intermediate value of the prismatic ratio, p, there exists a balance between variable buoyancy forces and vertical water acceleration forces such that the variation in net vertical force for the wavelengths of interest are substantially smaller than in the two fundamental cases examined above.

Consider for example a vertically moored structure of my invention as shown in FIG. 6C. In this case the parameters describing the physical properties of the bottle are r=1.853, (L/H)=0.5 and p=0.545. In addition, the maximum design wave height, $h_{max}$, is 100 ft. and the draft, H, is 125 ft., which is the same as in the two preceding examples. The curves of FIG. 6C show the variation of net vertical force when the bottle is subjected to the same three waves. In this case the maximum variation in force is about 7 percent and it occurs under the influence of both the 10 and 20 second waves, although it is an increase for the 10-second wave and a decrease for the 20-second wave. FIG. 6C shows that for a bottle with this specific distribution of displacement, vertical water acceleration forces dominate for short-period waves while variable buoyancy forces dominate for longer-period waves. Furthermore, there is a wave (about a 16-second wave) for which there is virtually no variation in net vertical force because there is a perfect balance between the variable buoyancy and vertical water acceleration forces.

If the prismatic ratio had been slightly greater, buoyancy forces would have dominated as in FIG. 6A, consequently the maximum variation due to the 20-second wave (a decrease in net vertical force) would have been greater than 7 percent. If the prismatic ratio had been smaller, as in FIG. 6B, vertical water acceleration forces would have dominated and consequently the maximum variation due to the 10-second wave (an increase in net vertical force) would have been greater than 7 percent. Therefore, my invention teaches that for the range of waves of interest, 10- to 20-second waves, that a best balance between the two influencing vertical forces is obtained for the combination of parameters in FIG. 6C, r=1.853, L/H=0.5 and p=0.545.

Figure 4B:
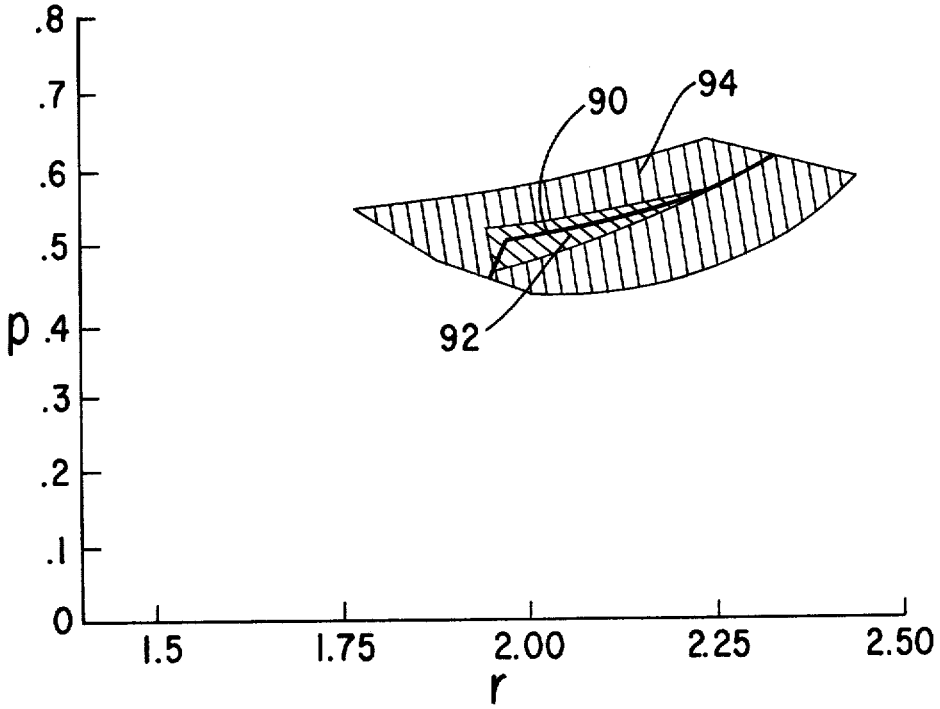
FIG. 4B is similar to FIG. 4A and illustrates selection of limits of the prismatic ratios for the same still water draft of 100 feet.
Figure 4A:
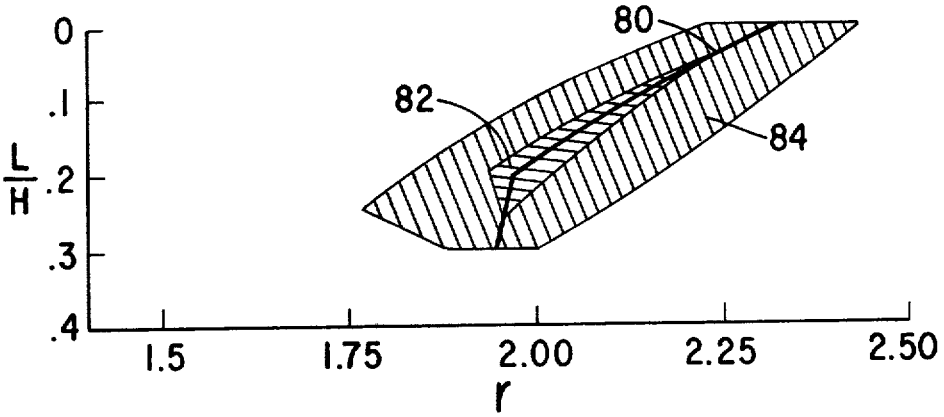
FIG. 4A illustrates relative vertical forces for ratios of the radii and the lengths of the prismatic portion and the auxiliary portion of the vertical buoyancy means for a still water draft of 100 feet.

There are other combinations of the parameters r, L/H and p for which a best balance between the two vertical forces is obtained. These are found by studying a wide range of practical combinations of the parameters in the same manner as described for FIG. 6C. For each set of parameters the maximum variation in net vertical force due to any wave in the range of interest is noted. The maximum variation is then plotted for each set of parameters on a type of "contour" plot such as in FIGS. 4A, 4B, 5A and 5B. Such a plot indicates the combination of parameters giving the lowest value for the maximum variation, the "valleys," and also shows which sets of parameters give slightly higher, but practically acceptable values of the variation. FIGS. 4A and 4B give values for a 100-ft. draft and FIGS. 5A and 5B for a 125-ft. draft.

The basic configuration of the bottle is described by any two of the three parameters. The most fundamental set is r and L/H where p is a function of these two parameters. On the other hand, it is convenient to express the design of the buoyancy members in terms of p and r. Therefore, both combinations of parameters are used in FIGS. 4A through 5B to illustrate the preferred design configurations. In FIG. 4A, solid line 80 represents the relation between r and L/H for which the magnitude of the net vertical force has been minimized over the selected range of wavelengths. The same relationship is illustrated by solid line 80A of FIG. 5A. These forces were evaluated using Equation (4).

It is recognized that the most practical selection of r and L/H may not always be for the minimum net vertical force and therefore some knowledge is needed of the influence of variations from the minimum. Area 82 on either side of line 80, FIG. 4A, (or area 82A of FIG. 5A) represents variations in r and L/H which might occur or be possible if a net vertical force equal to 10 percent of the total displacement would be tolerated. If a net vertical force equivalent to 12½% of the total displacement can be tolerated, r and L/H can vary so long as their corresponding ordinate and coordinate intersect within shaded area 84 in FIG. 4A.

Figure 5B:
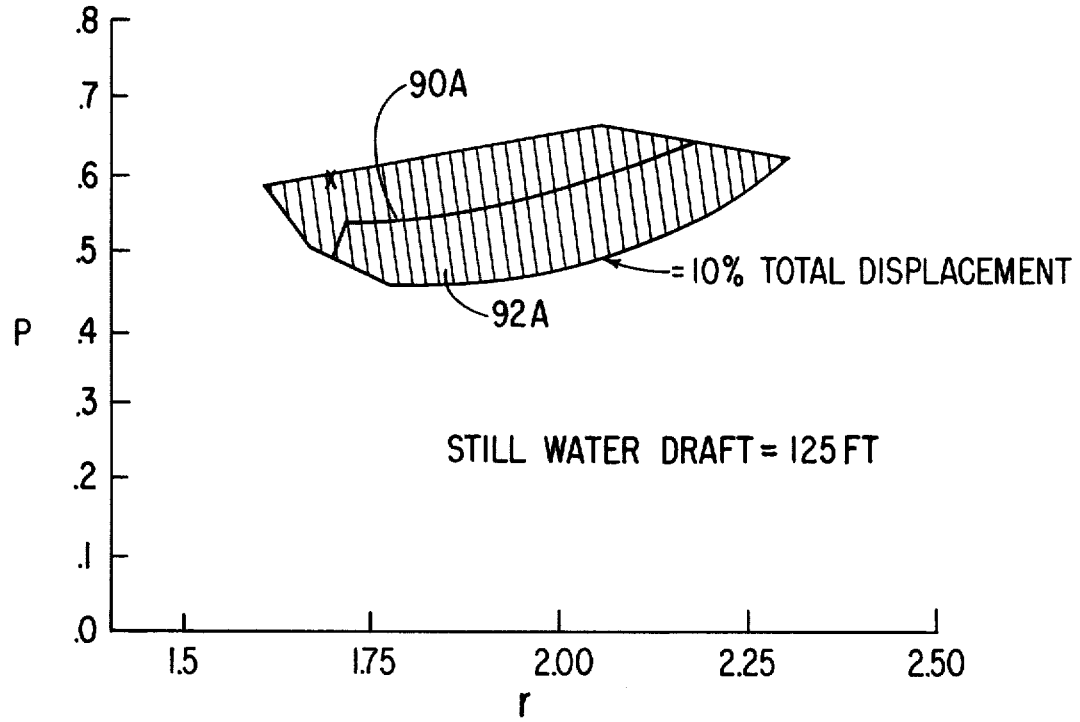
FIG. 5B is similar to FIG. 4B except it is for a still water draft of 125 feet.

In FIG. 4B, the solid line 90 represents the best selection of p and r for a design draft of 100 feet, i.e., the magnitude of the net vertical force has been minimized over the selected range of wavelengths for the value of p and r falling on solid line 90, (in FIG. 5B, solid line 90A represents the best selection of p and r for a design draft of 125 feet.) In FIG. 4B, shaded area 92 and shaded area 94, respectively represent regions for which changes are less than 10 percent and 12½ percent of the total displacement. In FIG. 5B, shaded area 92A represents regions for which changes are less than 10 percent of the total displacement for 125 feet draft.

Citing FIGS. 4A and 4B, my invention teaches that for the design of a vertically moored structure consisting of a single bottle having a draft of 100 ft. that the maximum variation of net vertical force on the structure could be minimized by keeping the displacement due to the prismatic portion between 40 and 60 percent of the total displacement ($0.4 \leqq p \geqq 0.6$). More specifically my invention teaches the designer that a more practical design, one for which the maximum variation of net vertical force is within 12.5 percent of the total displacement, can be obtained by selecting combinations of design parameters which fall within the shaded region 84 of FIG. 4A or 94 of FIG. 4B; or one for which the maximum variation of net vertical force is within 10 percent of the displacement can be obtained by a selected combination of design parameters which lie within the shaded region, 82 of FIG. 4A or 92 of FIG. 4B. Furthermore, my invention teaches that if the combination of design parameters lies on the heavy line, 80 in FIG. 4A or 90 in FIG. 4B, then the maximum variation of net vertical force is reduced to the smallest amount possible.

Figure 5A:
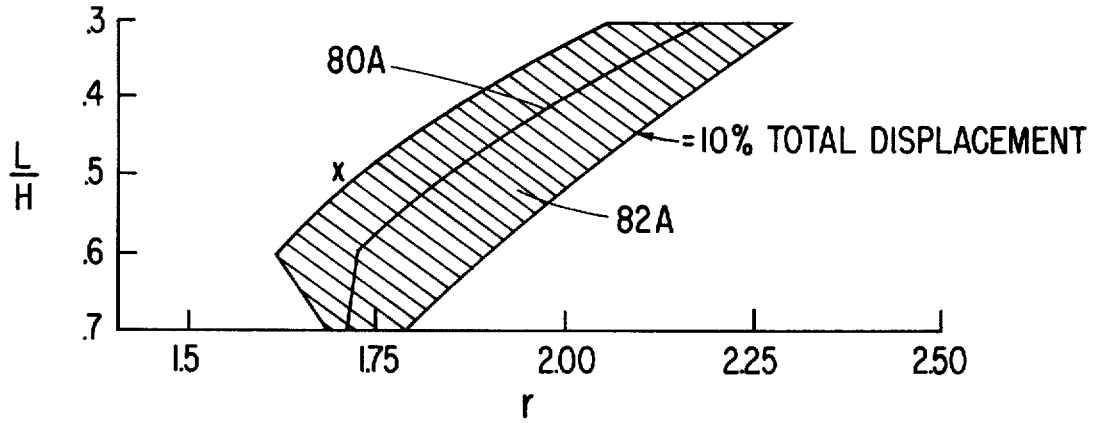
FIG. 5A is similar to FIG. 4A except it is for a still water draft of 125 feet.

Citing FIGS. 5A and 5B, my invention teaches that for the design of a vertically moored structure of this nature having a draft of 125 feet, that the maximum variation of net vertical force on the structure could be minimized by keeping the displacement due to the prismatic portion between 45 and 65 percent of the total displacement ($0.45 \leqq p \leqq 0.65$). More specifically my invention teaches that a more practical design for a vertically moored structure for which the maximum variation of net vertical force is within 10 percent of the total displacement can be obtained by selecting combinations of the design parameters which fall within the shaded region of FIGS. 5A and 5B. Furthermore, my invention teaches that if the combination of design parameters lies on the heavy line in FIGS. 5A or 5B, then the maximum variation of net vertical force is reduced to the smallest amount possible.

Figure 7A:
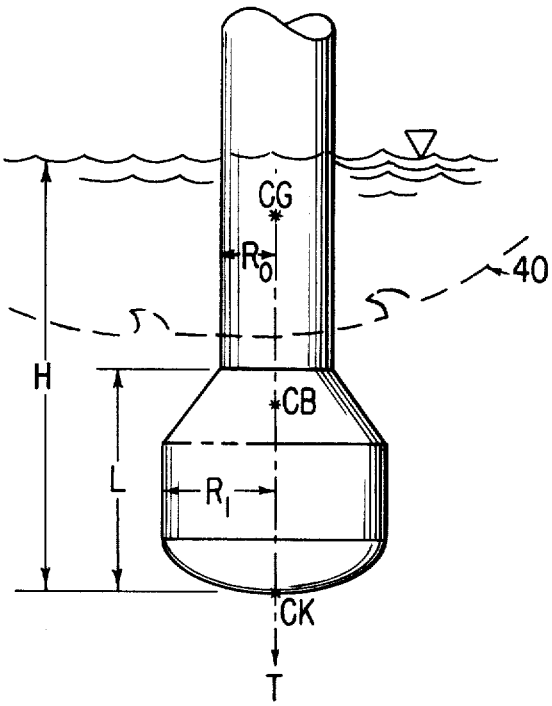
FIG. 7A shows the shape of a typical vertical buoyancy means of my invention.

The configuration of a typical bottle is illustrated in FIG. 7A, in which the basic design parameters L, H, $R_0$ and $R_1$ are defined. My invention teaches that it is best to maintain the annular or auxiliary displacement as low on the bottle configuration as is possible; in this way the annular or auxiliary displacement is maintained below the wave trough 40. The variation in net vertical force rises sharply if the annular portion of the displacement enters into the wave trough. Therefore, the height of the annular or auxiliary displacement is measured from the lower most point CK on the bottle. Consequently, my invention also teaches that a most advantageous design is one for which $$L \leqq H - h_{max}/2 \tag{5}$$

or $$(L/H) \leqq 1 - \tfrac{1}{2}(h_{max}/H). \tag{6}$$

FIG. 7A also shows the approximate location of the center of gravity CG and the center of buoyancy CB of a typical bottle configuration. The center of gravity of a vertically moored platform is generally higher than the center of buoyancy due to the large mass of structure, such as bottle extension or deck, and equipment located well above the design wave crest. Such a structure would normally be unstable if not for the vertical tethering force T which is usually applied near the base of the structure, for example, CK.

Figure 7B:
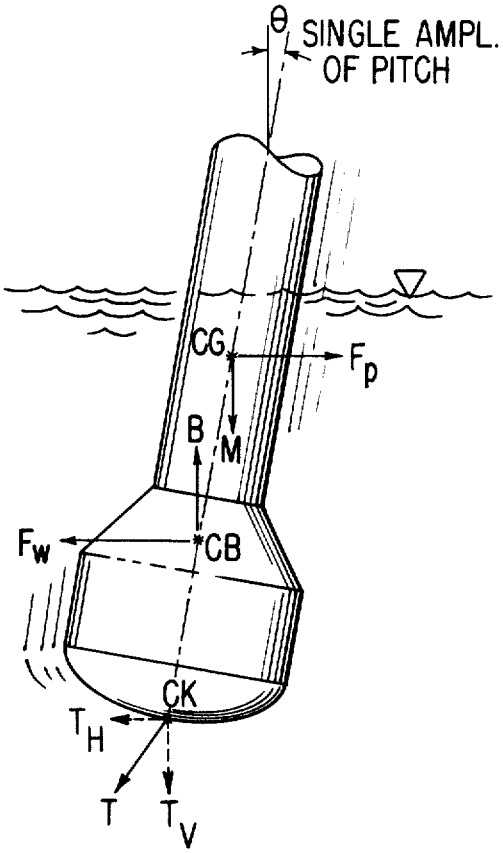
FIG. 7B shows the forces acting on a typical vertically moored platform comprising only one vertical float member of my invention.

This simple type of vertically moored structure consisting of a single bottle is restrained from vertical motion, but is free to move horizontally, and moreover, is subject to roll or pitch motions. When subject to the horizontal component of oscillatory wave forces, the platform moves back and forth through the water. FIG. 7B shows the bottle at its furthermost excursion towards the right; at this instant the structure is motionless and its acceleration is a maximum towards the left. At this instant the horizontal forces shown are in equilibrium. The governing horizontal forces are (a) the fictitious force due to platform acceleration $F_p$ which has a point of application at the center of gravity, (b) the horizontal water particle acceleration (or inertia) force $F_\omega$, which has a point of application in the vicinity of the center of buoyancy CB, and (c) finally the horizontal component of the tethering force $T_H$ which acts at the point CK. The above mentioned forces can be calculated by fundamental textbook dynamics and hydrodynamics. While these forces are in equilibrium in terms of horizontal force, they produce moments which are not by themselves in equilibrium. These moments will hereinafter be called "overturning moments." Water particle drag also produces components of horizontal force and overturning moment which are small due to the shape of the bottle, and therefore, will be negligible.

In the case of the simple vertically moored platform, consisting of a single bottle, overturning moments cause the bottle to pitch through an angle $\theta$, which is the single amplitude degree of pitch motion. The degree of pitch is large enough for the couple between the static vertical forces to be sufficient to counter balance the overturning moments. The static vertical forces consist of (a) the vertical component of the tethering force $T_V$, (b) the buoyancy force B and (c) the weight of the platform M.

Figure 2:
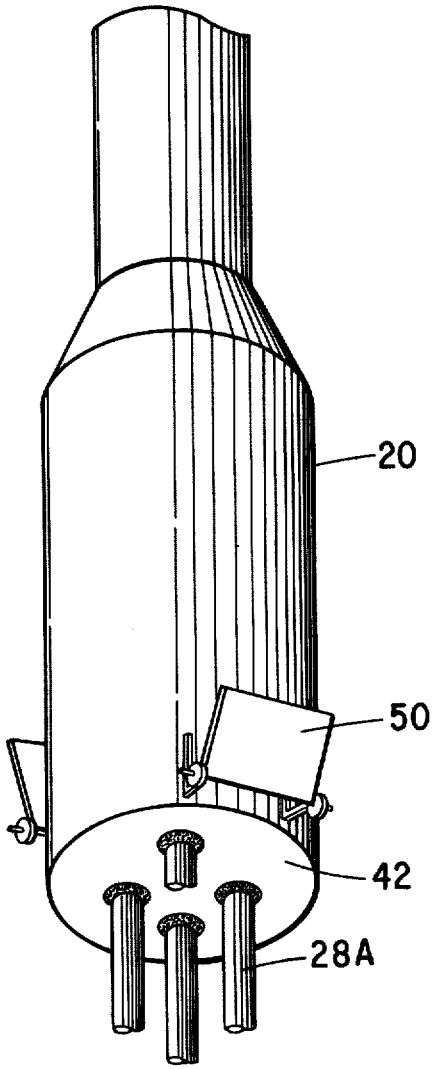
FIG. 2 illustrates a perspective view of a part of one of the vertical floats of FIG. 1.

I will now consider a more complex type of vertically moored platform made up of three or more bottles, such as the structure depicted in FIGS. 1, 2 and 3 which consists of four bottles, or legs. The individual bottles, or legs, are interconnected by a deck structure above water and structural bracing below water. The overall structure is extremely rigid. Vertical mooring lines, either cables or elongated tubular members, are attached to the base of each bottle, or leg. Therefore, the platform is free to move in a horizontal direction only and pitch or roll motions as well as vertical motions are restrained. The platform is subjected to the same forces and overturning moments as were the individual bottles discussed previously; the vertical and horizontal water particle acceleration forces, variable buoyancy force, and platform inertia force.

Figure 8:
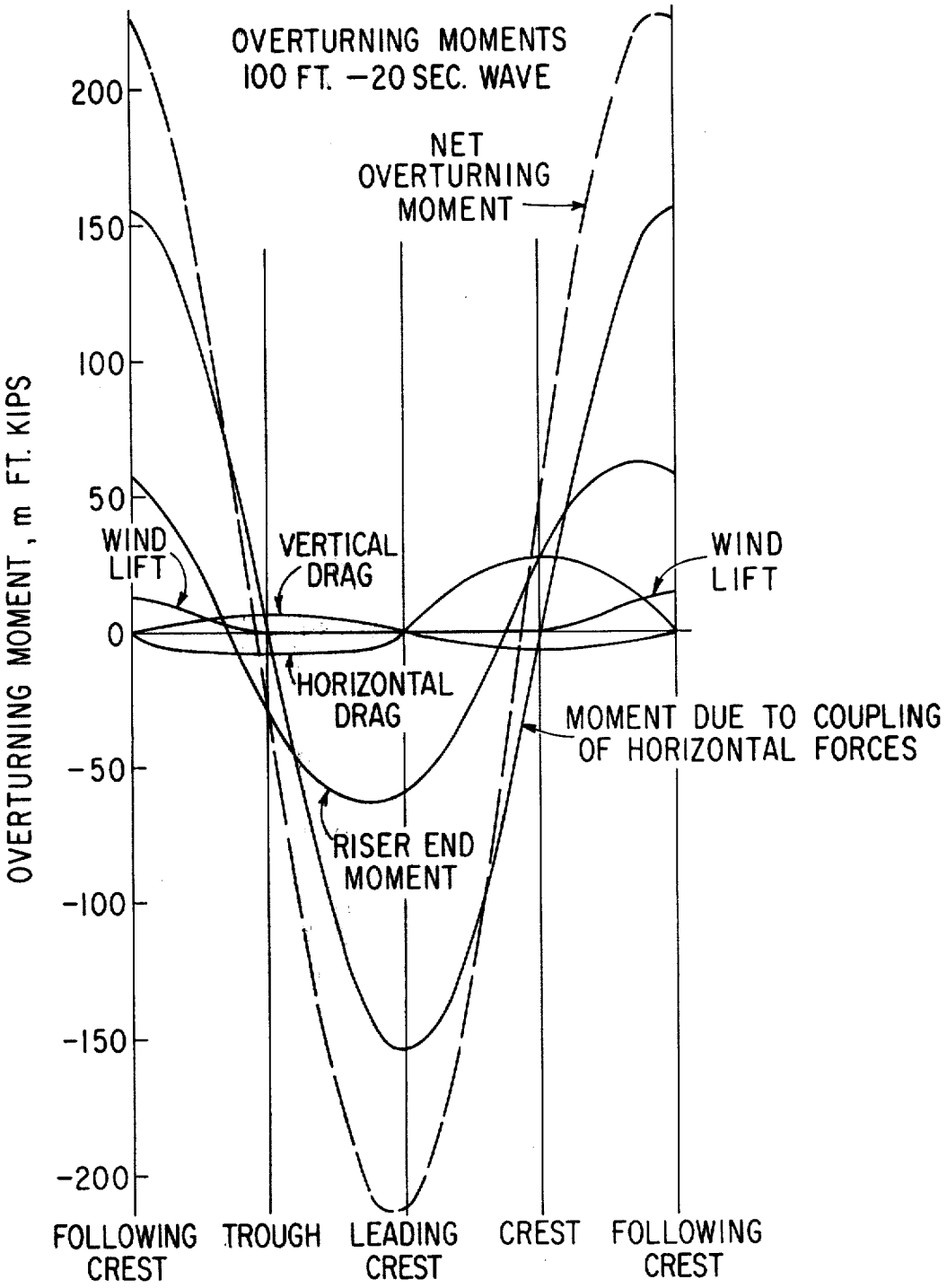
FIG. 8 shows an example of overturning moment on a floating structure such as shown in FIG. 1.

The dynamic vertical forces are primarily the variable buoyancy and vertical water acceleration forces as before. There is also a vertical drag force, but this is insignificant compared to the first two. The net resultant of these vertical forces is reacted by variations in the tethering forces, which is the same as with the single vertically moored bottle. Also as with the single bottle, horizontal forces such as the platform inertia force and the horizontal water inertia forces are reacted by the horizontal component of the tethering force. However, because this more complex vertically moored platform is not free to undergo pitch or roll motion, the overturning moments must be reacted by an additional variation in the tethering force. Overturning moment for a multi-legged vertically moored platform is still dominated by coupling between the horizontal forces such as due to (a) platform inertia, (b) horizontal water particle acceleration forces, and (c) the horizontal component of the tethering force. There are other, less significant sources of overturning moment such as shown in FIG. 8 for a 100-ft., 20-second wave. As noted previously horizontal drag produces a small but insignificant contribution to overturning moment. Vertical water particle drag forces, due to the phase difference of the wave cycle at different legs, also contributes a small amount of overturning moment. Wind lift on the deck may produce a small amount of moment. If elongated members, such as risers, are used to tether the platform instead of cables and if the ends of these members are rigidly attached to the platform rather than attached by a hinged connection such as a gimbal joint, then there is a significant amount of riser end moment which adds to the overturning moment on a platform. The dashed line in FIG. 8 shows the net overturning moment on a typical four-legged, vertically moored platform due to a 100-foot-high, 20-second-period wave. The net overturning moment is not radically different from the overturning moment due only to coupling of horizontal forces.

Using simple textbook statics, the variation in net tethering force due to overturning moment is calculated by making the most reasonable assumption that the platform is very rigid compared to the vertical tethers which act like elastic springs. For a four-legged platform, overturning moment is most demanding on the tethers at any given leg if the storm, or waves, approach the platform along a diagonal rather than a direction normal to a side. In this case the tethers at the two diagonally opposite legs which are in line with the storm direction provide the entire reaction to overturning moment. If the center-to-center leg spacing along a side is "A," then the reaction to overturning moment in each resisting leg is the value of the overturning moment divided by $A\sqrt{2}$. The tethering forces in the other two legs are not affected by overturning moment.

Figure 9:
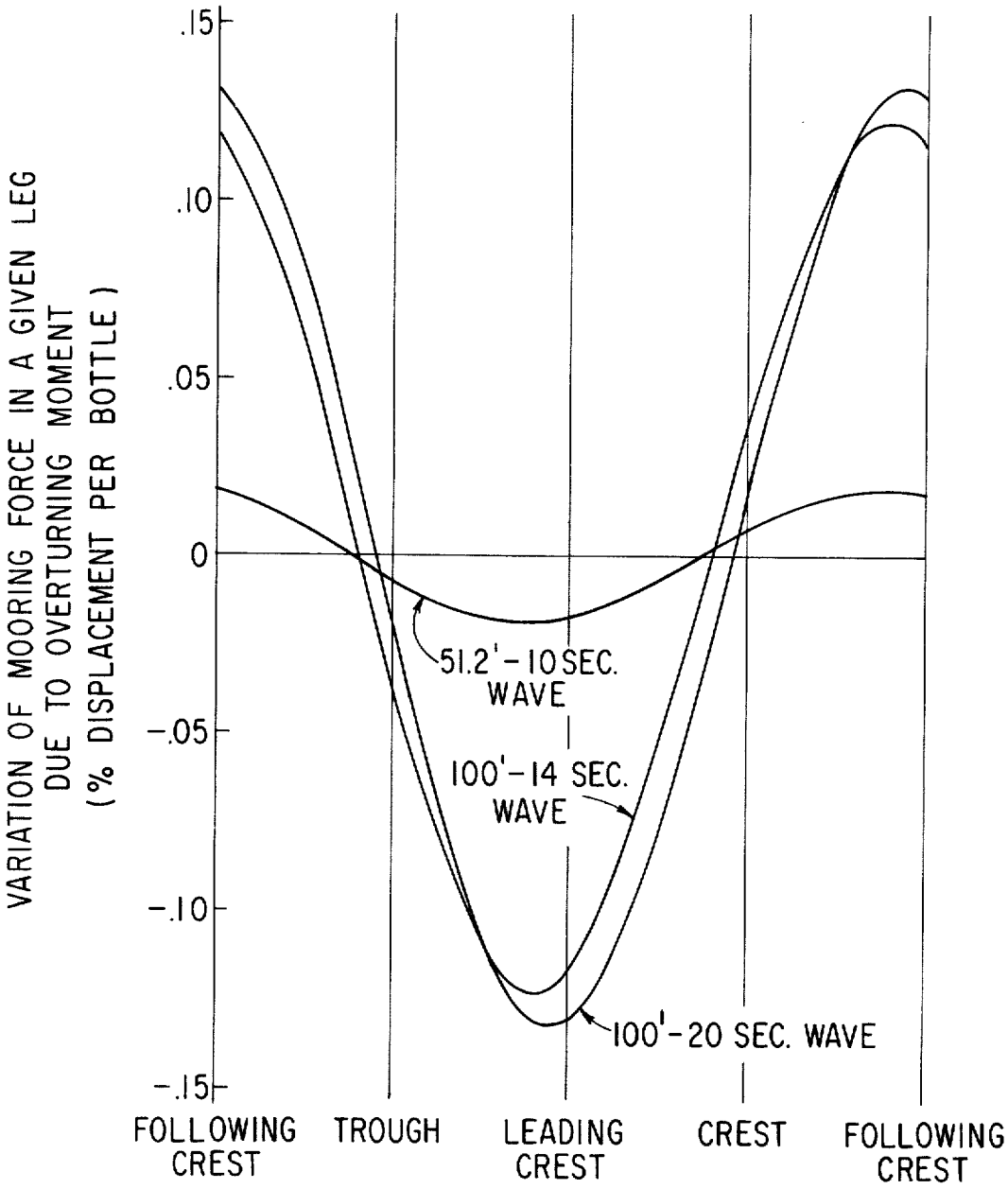
FIG. 9 shows an example of variation in mooring force for a given leg due to the overturning moments shown in FIG. 8.
Figures 11A, 11B:
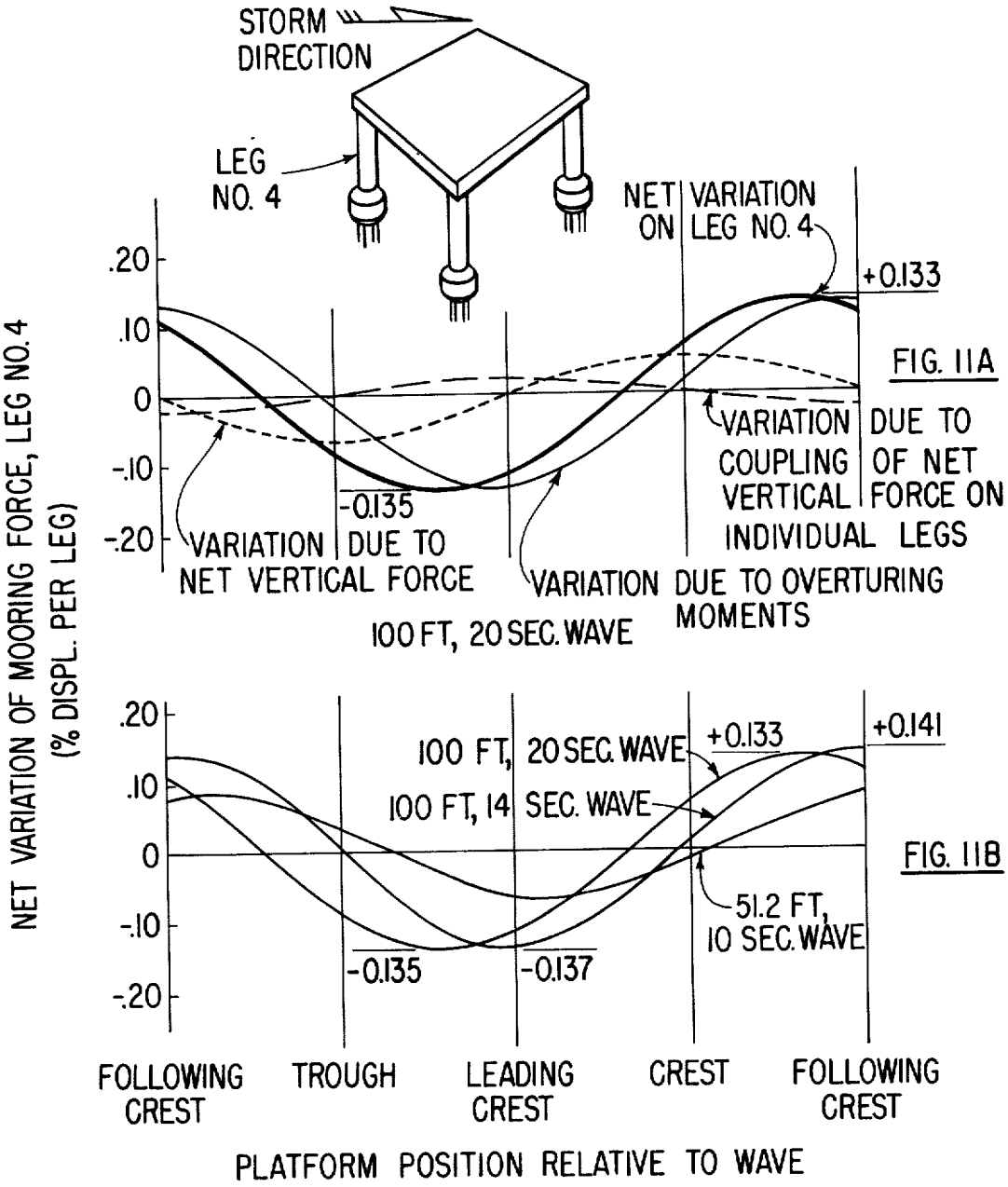
FIGS. 11A and 11B illustrate the net variation in mooring force at one leg of a vertically moored platform which comprises vertical float members of a typical configuration according to my invention.

Considering the influence of static horizontal forces such as wind and current on variation of vertical tethering forces, one of the two legs resisting overturning moment will be more heavily loaded than the other. This leg, which will hereinafter be called Leg No. 4 as indicated in FIG. 11A, is that leg, or bottle, which is oriented toward the oncoming waves. While the influence of static horizontal forces will not be considered here, it is convenient to distinguish this leg from the others. For a positive overturning moment as shown in FIG. 8, the variation in tethering force at Leg No. 4 is positive as shown in FIG. 9, for each of three different waves. FIG. 9 shows the variation in tethering force in Leg No. 4 due to overturning moment only. The variation is expressed as a percent of the displacement per bottle, or leg; in this case it is a percent of one-fourth of the total displacement.

In a floating structure as described here, the legs may be spaced 200 feet apart, more or less. Because of the wide leg spacing, each of the legs may experience different net vertical forces at any given instant. Consequently, it is impossible for all of the legs to simultaneously experience the maximum net vertical force for long-period waves. Therefore, the net vertical force on the entire four-legged structure will never be as great as four times the net vertical force on a single vertically moored bottle, and in turn, the reaction in the tethers at each leg due to net vertical force only will never be as great as the reaction in the mooring lines of a single bottle.

Figure 10:
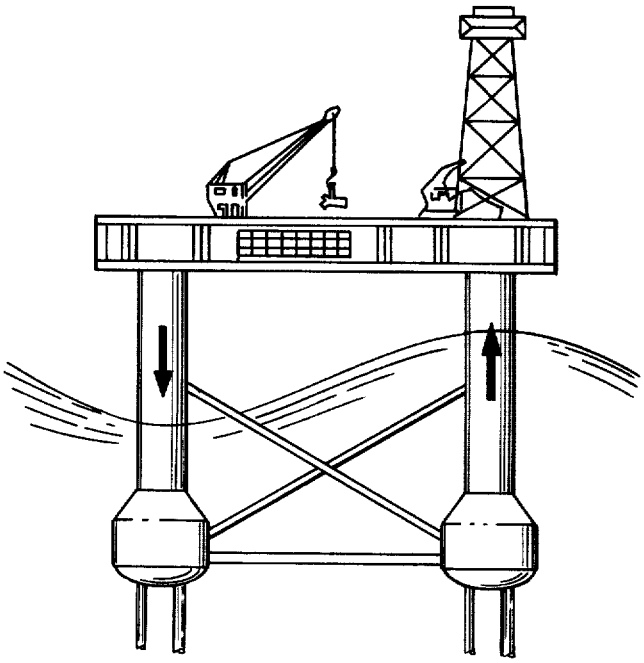
FIG. 10 demonstrates the typical influence on a floating structure according to my invention due to coupling between net vertical forces on individual legs.

Furthermore, because of the wide leg spacing the differences in net vertical forces on individual legs at any instant give rise to couples which must also be reacted by variations in the tethering forces. Consider the example depicted in FIG. 10, where the four legs are spaced 200 feet apart in the outline of a square and a wave with a 400-foot wavelength is passing the platform. There is an instant when the crest of the wave is aligned with two legs and the trough is aligned with the other two. If the variable buoyancy forces are governing for this wave, then the net vertical forces on the bottles at the crest are upwards and at the trough are downwards, as illustrated by the arrows in FIG. 10. While the net vertical force on the entire structure may be nearly balanced, there is a relatively large couple, or moment, acting on the structure due to the differences in net vertical force. In accordance with my invention, this couple must be reacted by variations in the tethering forces in the same manner as were overturning moments.

It can be shown that if the variable buoyancy contribution to net vertical force is greater than that due to vertical water particle acceleration, such as with long period waves, then this coupling of net vertical forces acts in the opposite sense to the dominant source of overturning moment mentioned previously. Consequently, the coupling between net vertical force on each leg tends to reduce the influence of overturning moment, especially for long period waves. However, as the net vertical force on individual legs is increased in order to reduce the effect of overturning moment, the net vertical force on the entire structure is increased. In other words, as the variation in mooring force is decreased through a reduction of the effect of overturning moment, it is at the same time increased due to the increase of net vertical force on the platform. There exists a proper amount of net vertical force on individual bottles for which the net effect of these influences is minimized. It is a concept of this invention to minimize the variation in mooring force on the most heavily loaded leg, and therefore the maximum mooring force over the range of important wavelengths, through a proper selection of the ratios of variable buoyancy force and vertical water acceleration force as was done previously to minimize net vertical force for the single vertically moored bottle.

There are three contributions to the variation in mooring force in the most heavily loaded leg. These are (a) the reaction to net vertical force on the entire structure, (b) the reaction to overturning moments and (c) the reaction to coupling of vertical forces on individual, widely spaced legs. FIG. 11A shows the variations in mooring force in Leg No. 4 due to each of these influences for a 100-ft., 20-sec. wave. The net variation is also shown by the heavy line. For this example the platforms consist of four bottles where each bottle has the same physical properties as in FIG. 6C: $r=1.853$, $L/H=0.5$, $p=0.545$. The variation in mooring force is expressed as a percent of the displacement per bottle. The maximum variation for the 20-second wave is about 13.5 percent and occurs shortly after the wave trough has passed the center of the platform. In FIG. 11A it is worth pointing out that for the long period wave, the variation due to coupling of net vertical forces on individual legs while small in magnitude acts opposite in sense to the variation due to overturning moments.

FIG. 11B shows the net variation in mooring force for three different waves. It is evident from these curves that the maximum variation in mooring force due to any of the waves in the range of interest is 14.1 percent. For the platform examined in FIG. 11, the draft is 125 feet, leg spacing is 160 feet, total displacement is 28,675 kips (1 kip = 1,000 lb.), weight of structure and equipment is about 18,675 kips and the total, still water mooring force is 10,000 kips. While the maximum net variation in mooring force is 14.1 percent of the displacement per leg, it is about 40 percent ($14.1\times28{,}675/10{,}000=40.4$) of the still water mooring force per leg.

FIGS. 12 and 13 show the influence of other bottle configurations on maximum net variation in mooring force. In each of these examples the platform size including displacement is the same as in FIG. 11 and only the proportions of prismatic and annular displacements are altered by varying the shape of individual bottles. The variation in mooring force due to overturning moment is essentially the same in each case for similar waves. Therefore, the net variation in mooring force is altered only by the variation of net vertical forces on individual bottles.

Figures 12A, 12B:
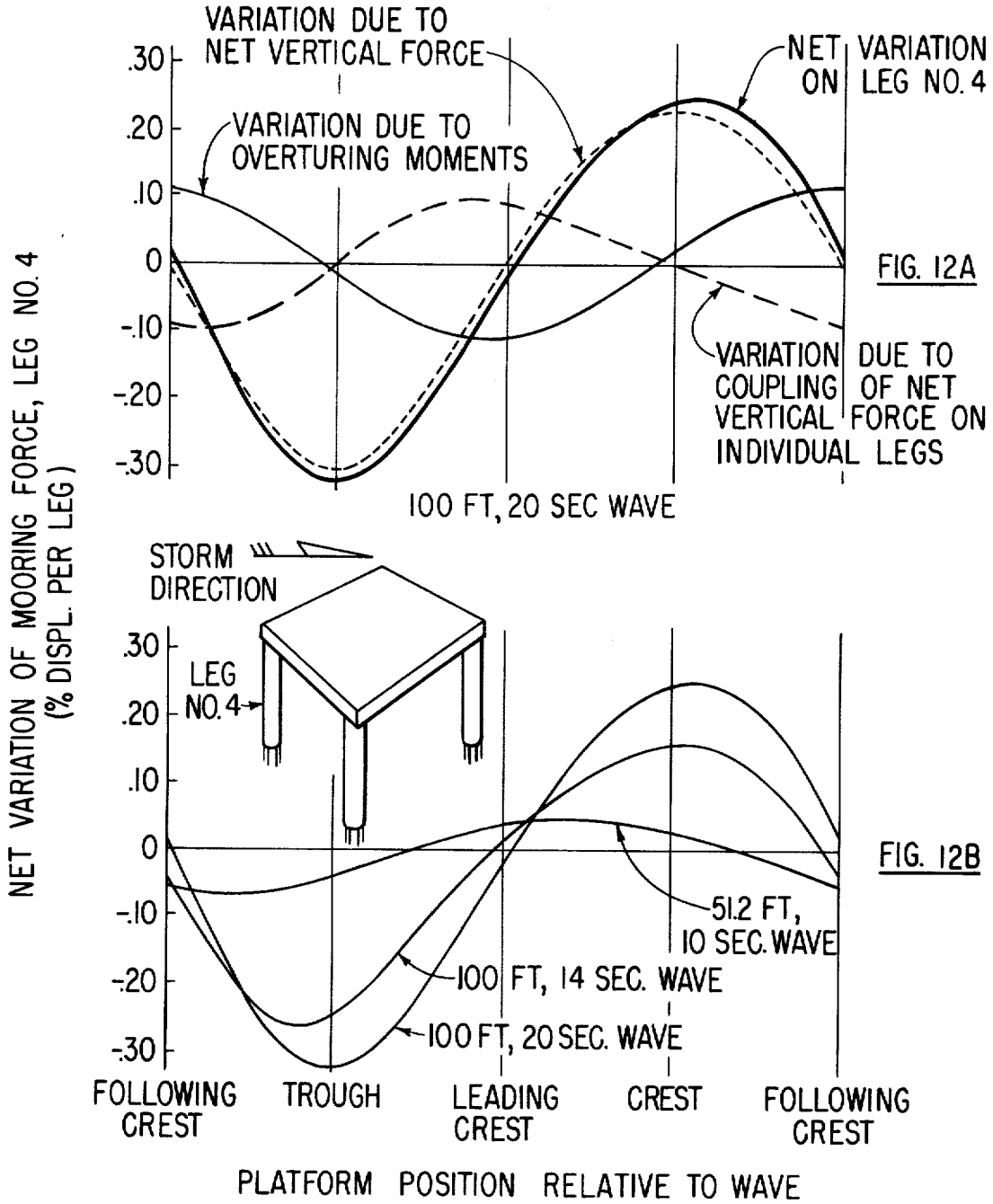
FIGS. 12A and 12B illustrate the net variation in mooring force at one leg of a vertically moored platform which comprises vertical float members made up of prismatic cylinders.

In FIGS. 12A and 12B the displacement is due entirely to the cylindrical prismatic portion ($p=1$). It is interesting that the variation due to coupling of net vertical forces on individual bottles almost completely counterbalances the variation due to overturning moment. Consequently, the net variation in mooring force is almost entirely due to total net vertical force on the platform. As a result, the maximum variation in mooring force is 32 percent of the displacement per bottle and occurs when the trough of the wave is at the center of the platform. This is very similar to the response of the vertically moored, single cylindrical bottle.

Figure 13A:
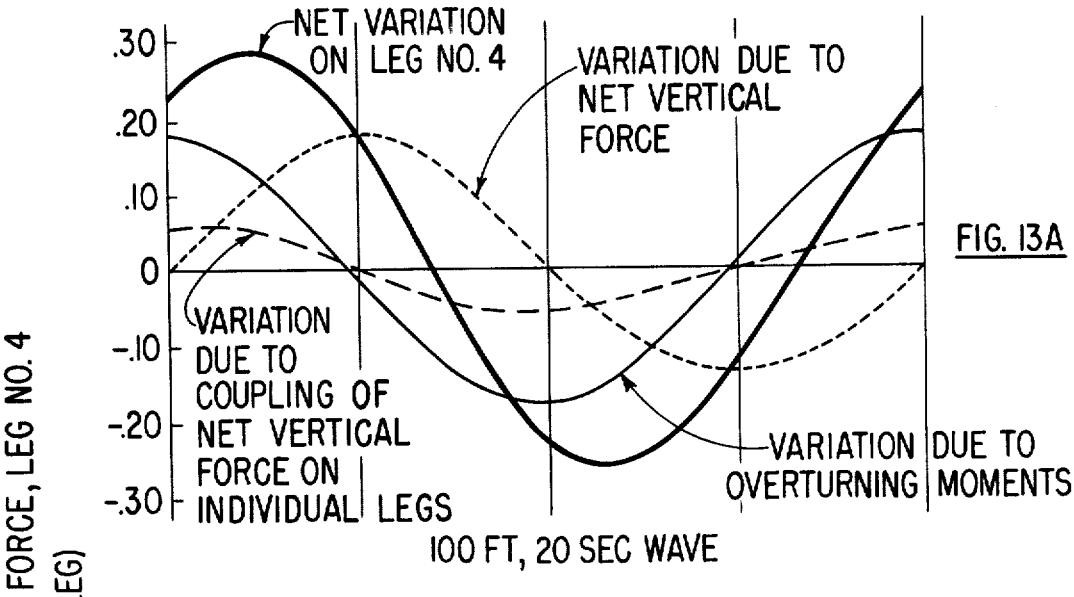
FIGS. 13A and 13B illustrate the net variation in mooring force at one leg of a vertically moored platform in which the float members are made up of deep spheroidal floats only.
Figure 13B:
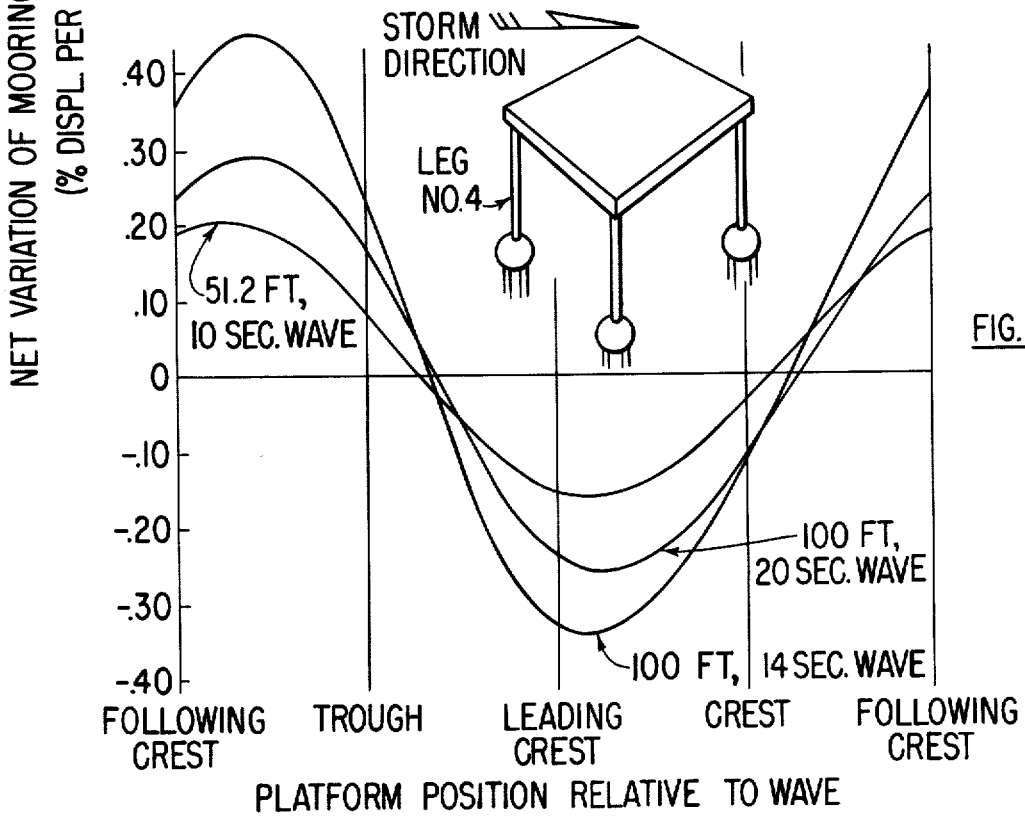

In FIGS. 13A and 13B the displacement is due entirely to the annular portion at the base of the leg ($p=0$). In this case the net variation of mooring force is a complex combination of the three influences as shown in FIG. 13A for the 20-second wave. Because vertical water acceleration forces are dominating instead of variable buoyancy forces, the influences due to net vertical force on individual legs act in the opposite sense as for FIG. 12A. Consequently, the variation in mooring force due to coupling of net vertical force on individual legs adds to the variation in mooring force due to overturning moment. Furthermore, the maximum net variation in mooring force, 45 percent, is much greater than the net vertical force on a single bottle of this configuration.

It is apparent by comparing FIG. 11B with FIGS. 12B and 13B that the maximum variation in mooring forces, for the range of waves of interest, can vary significantly depending on the configuration of the individual legs. I have discovered that there are certain combinations of the design parameters r, L/H and p for which a minimum value can be achieved for the maximum variation in mooring force. A type of "contour" plot, similar to those prepared for net vertical force on individual bottles in FIGS. 4 and 5, can be prepared giving the percentage variation in mooring force as a function of the shape parameters r, L/H and p.

Figure 14:
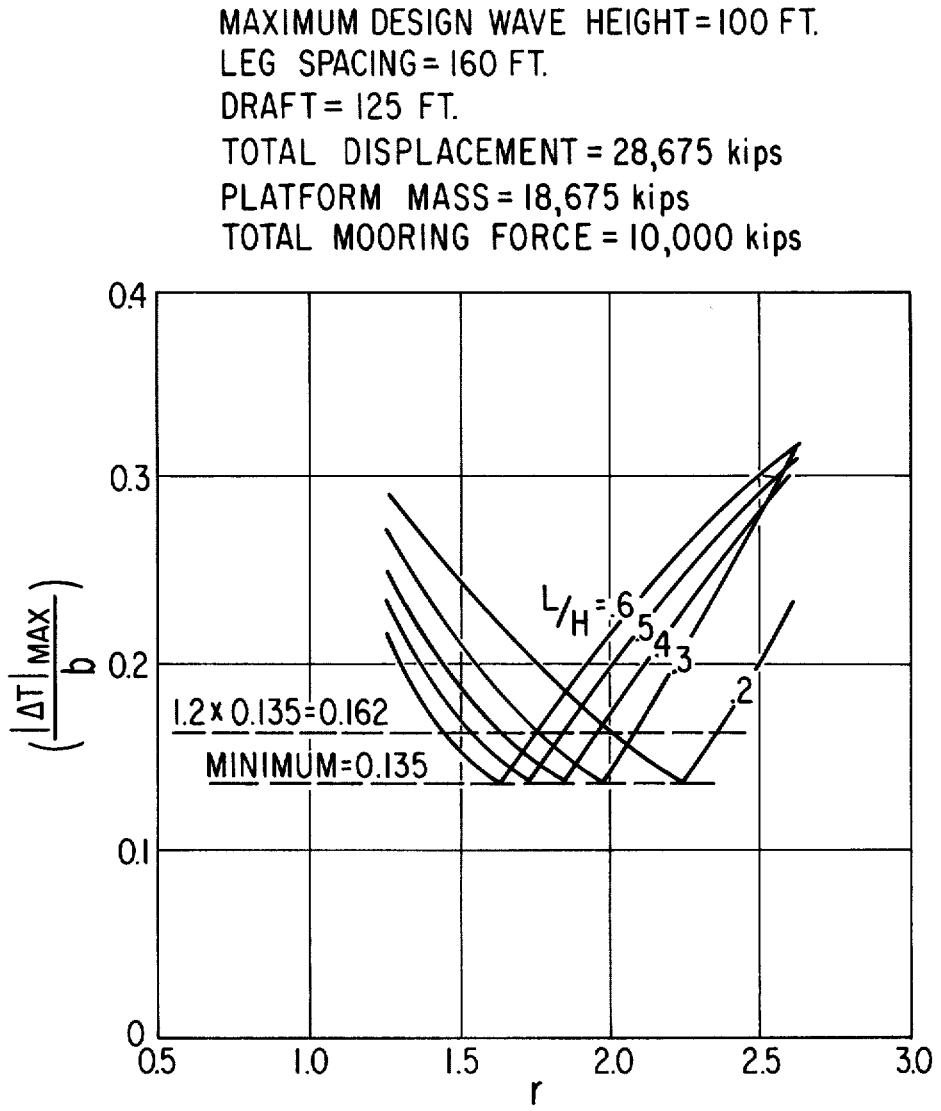
FIG. 14 shows the maximum variation in mooring force at a given leg, expressed as a percent of the displacement per leg, for various values of the shape parameters r and (L/H) (the term r, L and H are defined hereinafter) and for particular platform size and design condition, as noted.
Figure 15B:
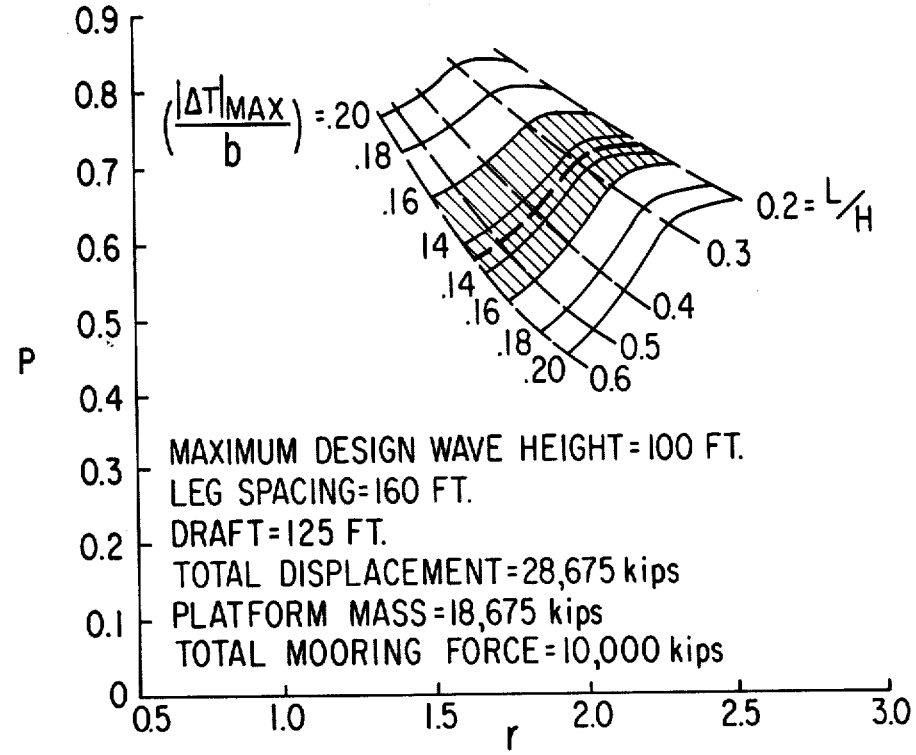
Figure 15A:
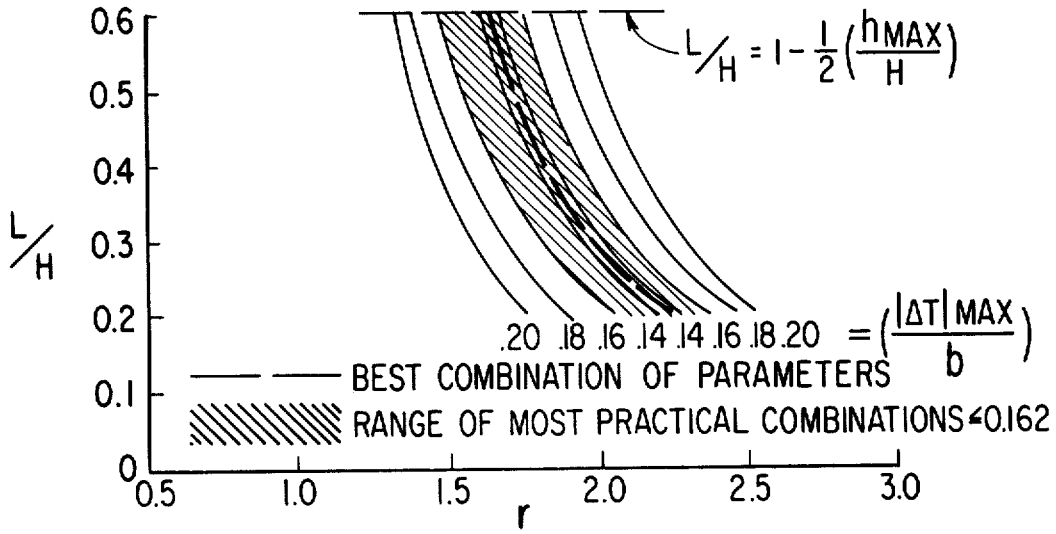

In order to prepare such a plot we need to examine a large number of examples such as in FIGS. 11, 12 and 13 for the range of waves of interest and for a wide range of the shape parameters. For each set of shape parameters the maximum variation of mooring force is noted. Next, the values of maximum variation can be plotted as a function of the shape parameters such as in FIGS. 14 or 15. Actually, FIG. 14 assists in preparing FIG. 15. In FIG. 14 the maximum variation (designated $|\Delta T|$), as a percent of displacement per leg (designated b), is plotted versus r for fixed values of L/H. This simplifies the procedure for determining the values of r and L/H at which the maximum variation is an even value, such as 0.14, 0.16, 0.18, 0.20, etc. Finally, the contours for fixed values of maximum variation are plotted versus L/H and r as in FIG. 15A, or versus p r as in FIG. 15B. FIGS. 14, 15A and 15B have been prepared from calculations for a specific platform and design criteria. The pertinent data are 1. Maximum Design Wave Height = 100 feet,
2. Draft = 125 feet,
3. Leg Spacing = 160 feet,
4. Total Displacement = 28,675 kips,
5. Platform Weight = 18,675 kips,
6. Total Still Water Mooring Force = 10,000 kips.

From FIG. 14 it is apparent that the minimum attainable value of maximum variation is about 13.5 percent of displacement per leg ($28{,}675/4=7{,}170$ kips). This would account for about a 39 percent variation of the still water mooring force per leg ($13.5\times28{,}675/10{,}000=38.7$). It may not always be practical to select a configuration for which the shape parameters indicate the lowest value of maximum variation. However, my invention teaches that a practical range of maximum variation, e.g., less than 1.2 times the lowest value, is attainable if the set of shape parameters lie within the 16 percent contours ($1.2 \times 13.5 = 16.2$), the shaded regions of FIGS. 15A or 15B.

My invention teaches, when designing a platform for the size and maximum design wave height listed above, that maximum variation of mooring force for the range of wave lengths of practical interest can be minimized to a range of practically acceptable values (e.g., less than about 16 percent) if the shape parameters which govern the shape of the individual bottles lie within or near the shaded regions of FIGS. 15A or 15B. Moreover, the best selection of shape parameters in order to minimize variation in mooring forces are those falling on the heavy dashed line in either FIGS. 15A or 15B.

FIG. 15 illustrates the best selection of shape parameters for a limited case, namely one designed for a maximum wave, draft, displacement, etc., equal to the values itemized above. I will now demonstrate the best selection of shape parameters for other values of leg spacing, draft, maximum design wave height, displacement and platform weight.

Figure 16B:
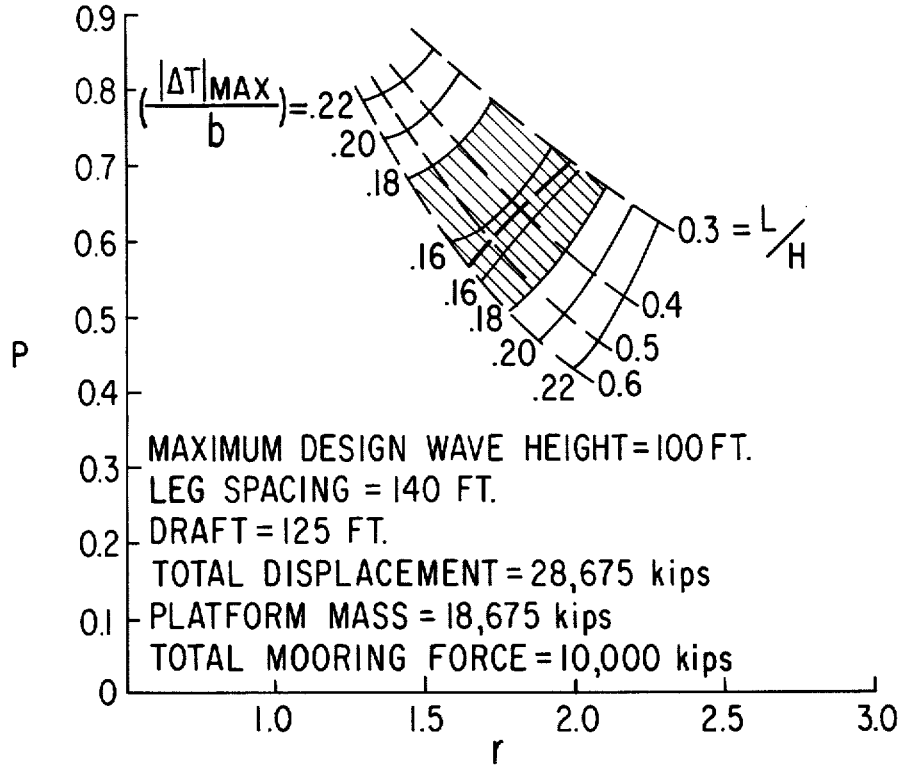
Figure 16A:
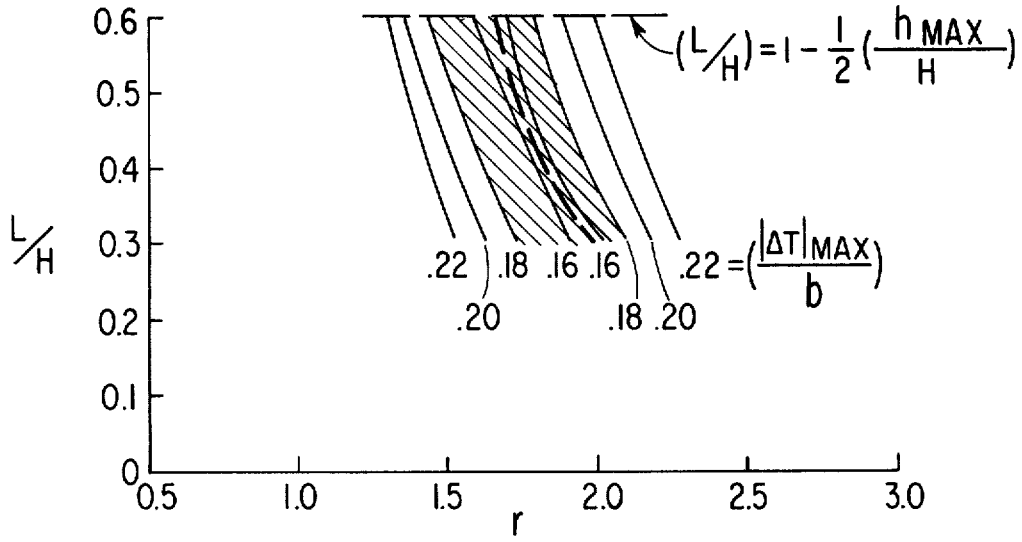
Figure 17B:
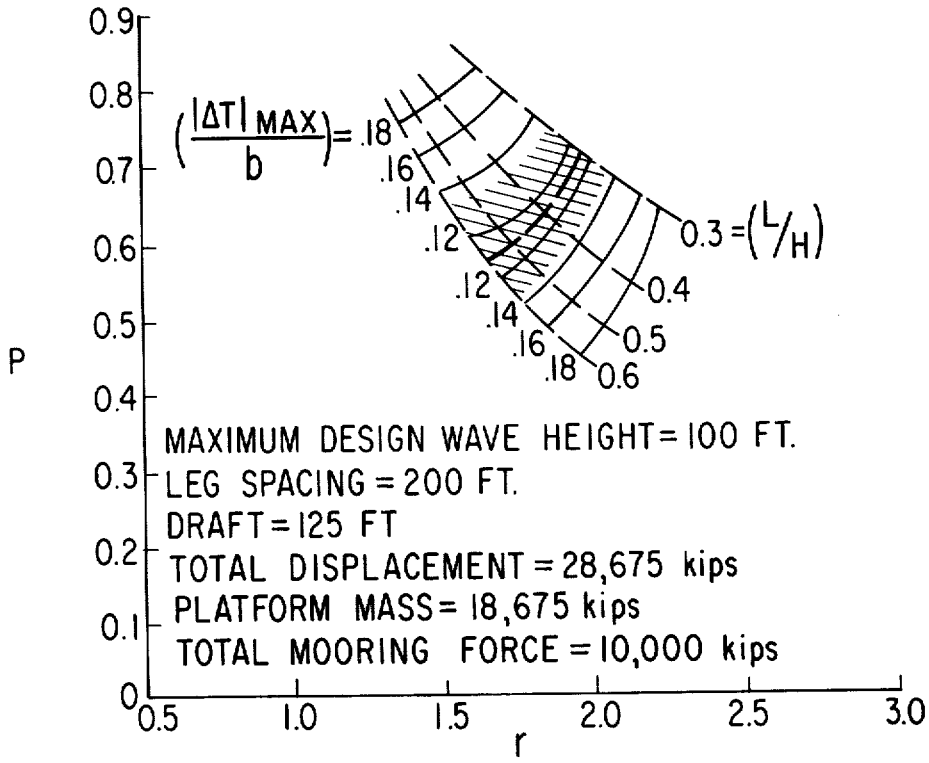
Figure 17A:
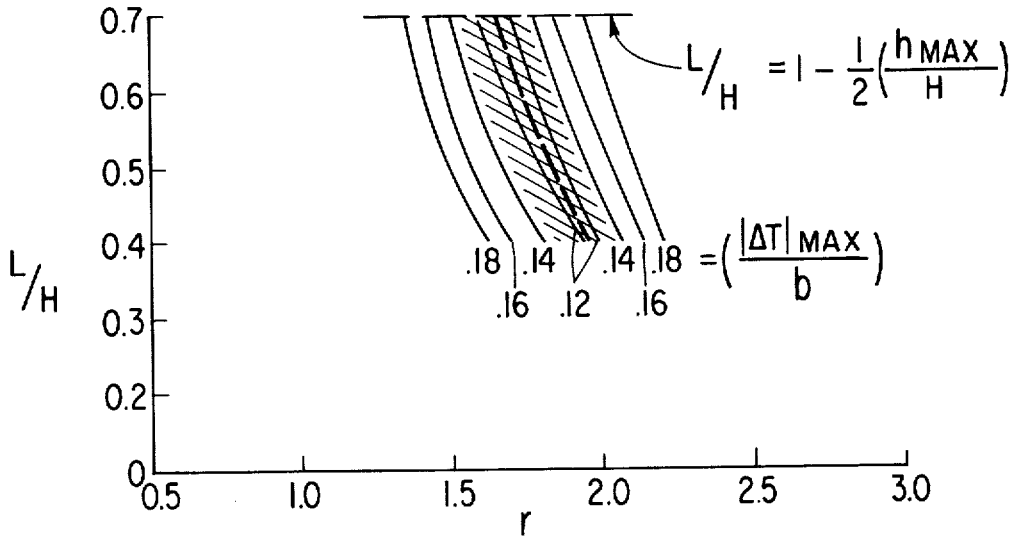

Comparison of FIGS. 16, 15 and 17, in that order, demonstrates the influence of varying leg spacing. In these examples all other parameters remain constant, while the leg spacing takes values of 140 feet, 160 feet and 200 feet, respectively. Changing the leg spacing has not significantly altered the position of the heavy dashed line which describes the best selection of shape parameters. Neither has it significantly altered the region for selection of most practical combinations of shape parameters, the shaded region in each figure. (In these examples and all subsequent examples, the shaded region bounds those sets of parameters for which the maximum variation is less than or equal to 1.2 times the lowest attainable value of maximum variation). However, for the range of values of leg spacing examined, the minimum attainable value of maximum variation is approximately proportional to the inverse of leg spacing.

My invention teaches the best combination of shape parameters defined by the heavy, dashed line in FIG. 15 and the most practical combination of design parameters as defined by the shaded region in FIG. 15 are independent of leg spacing. However, my invention also teaches that the lowest attainable value of maximum variation is inversely proportional to leg spacing.

Figure 18B:
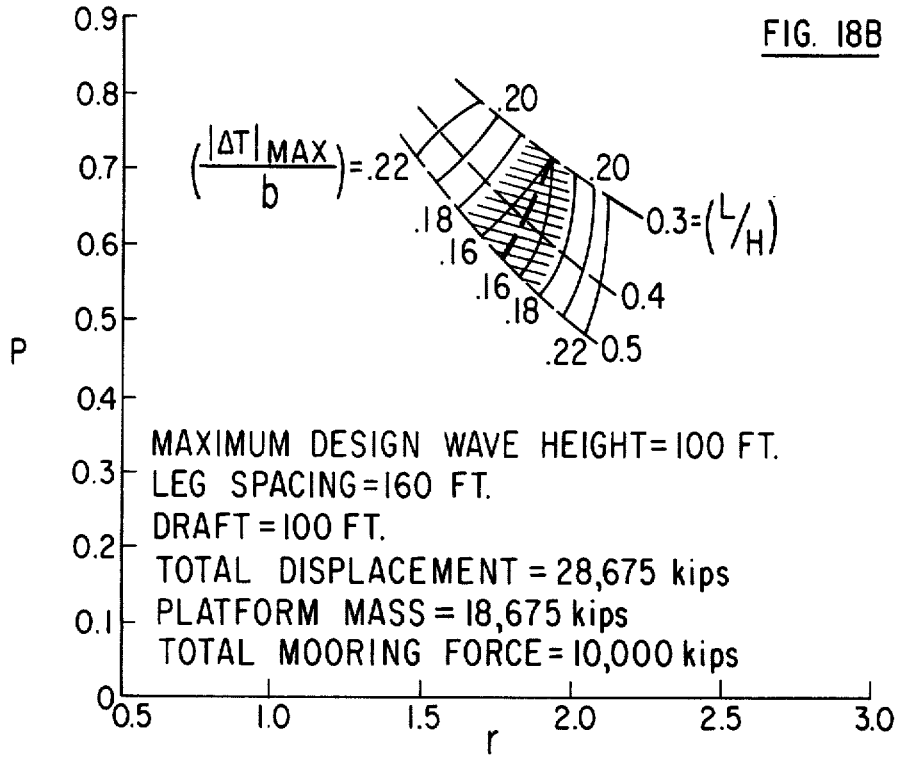
Figure 18A:
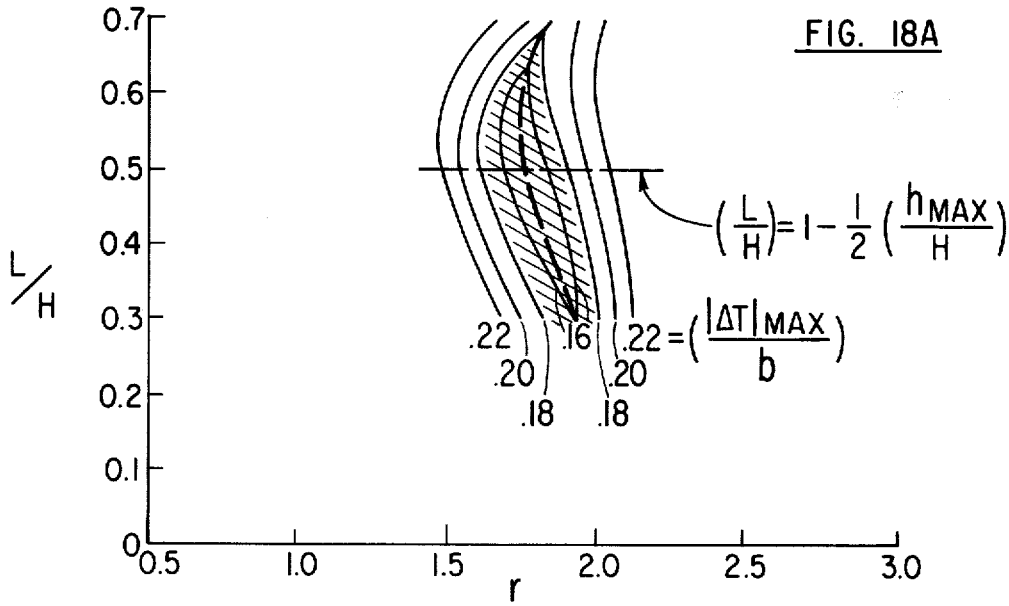
Figure 19B:
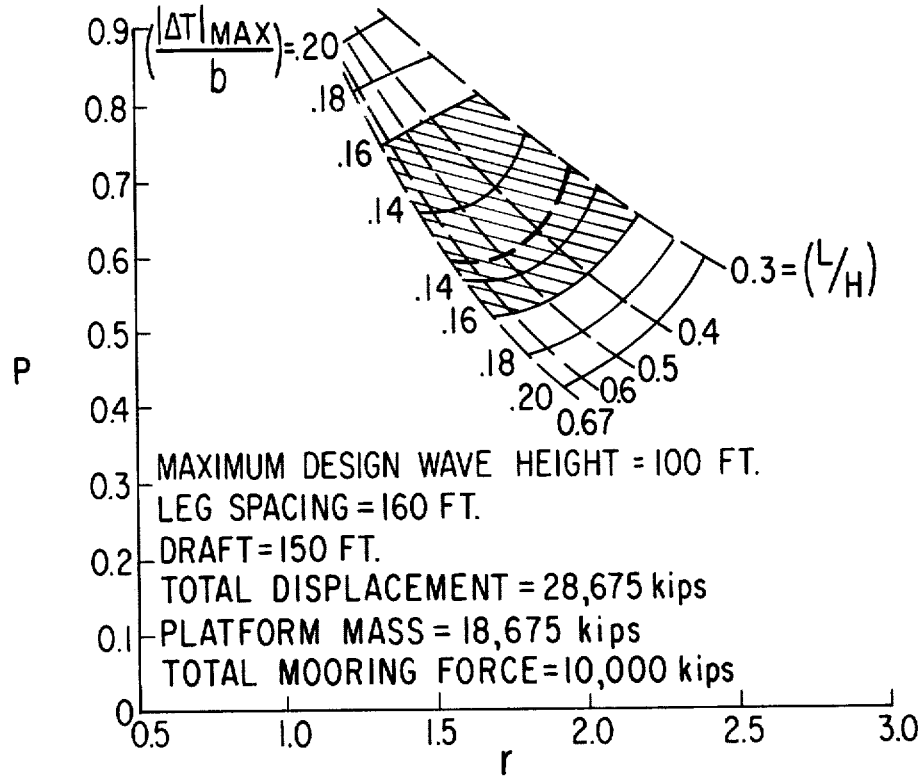
Figure 19A:
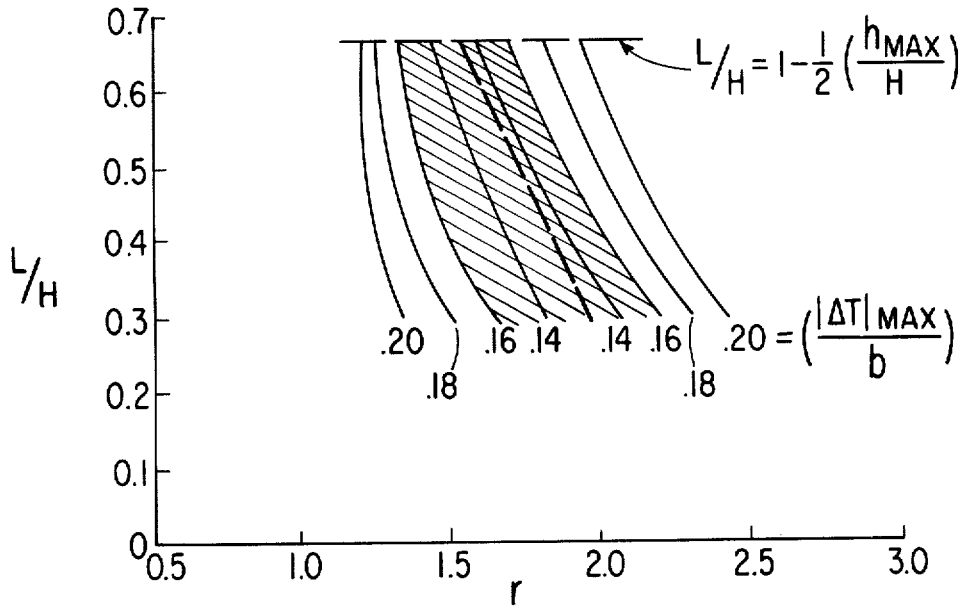

Comparison of FIGS. 18, 15 and 19 in that order demonstrate the effect of altering draft. In these three examples all parameters are the same as listed above except the still water draft of the bottles, which are 100 feet, 125 feet, and 150 feet, respectively. Changing the draft does alter slightly the position of the heavy dashed line and the shaded region, which denote the best combination of shape parameters and the range of practical combinations of the shape parameters, respectively.

As one example, my invention teaches for a platform with the following properties:

1. Maximum Design Wave Height = 100 feet
2. Total Displacement = 28,675 kips
3. Platform Weight = 18,675 kips
4. Total Still Water Mooring Force = 10,000 kips and for a 100-foot draft that the most practical combination of shape parameters are those falling in the shaded region of FIGS. 18A and 18B and that the best selection of shape parameters are those lying on or near the heavy dashed line in FIGS. 18A and 18B. Also for a platform with the above list of properties, but a draft of 150 feet, my invention teaches that the most practical combination of shape parameters are those lying in the shaded region of FIG. 19 and that the best selection of shape parameters are those sets lying on or near the heavy, dashed line of FIG. 19. Furthermore, for a platform with the properties listed above and designed for a maximum design wave height listed above but having a draft between 100 feet and 150 feet, the range of most practical sets of the shape parameters are found approximately by interpolating between the shaded regions of FIGS. 18, 15 and 19; and the best combination of shape parameters are determined approximately by interpolating between the heavy dashed lines in FIGS. 18, 15 and 19. For these figures the maximum value of the prismatic ratio p is about 0.8 and the minimum value is about 0.5. However, in FIG. 4 the minimum value of p is about 0.4. I have found that for a wide range of design in vertically moored platforms (covering the generally acceptable sizes) that the prismatic ratio should be between about 0.4 and 0.8.

Furthermore, the lowest attainable value of maximum variation is influenced significantly by changes in draft, especially for shallower draft. The lowest value is about 15 percent for a 100-foot draft as compared to 13.5 percent for a 125-foot draft and about 13.2 percent for a 150-foot draft. For a decrease in draft less than 100 feet, the lowest value of the maximum variation rises rapidly, while for an increase in draft about 150 feet there is little additional reduction in the lowest value of maximum variation. Therefore, my invention teaches that, at least for a maximum design wave height $h_{max}$ of 100 feet, the penalty in terms of variation of tethering force becomes very severe for a draft H less than 100 feet ($h_{max}/H > 1.00$). Furthermore, my invention teaches that, for the same maximum design wave height, $h_{max}$, the penalty in terms of unnecessary structure becomes costly with a design draft H greater than 150 feet ($h_{max}/H < 0.67$). Therefore, my invention teaches that for a platform of the displacement being discussed here, 28.675 kips, the most attractive ratio ($h_{max}/H$) of maximum design wave height to draft is about 0.8 and that the practical range for this ratio is between 0.67 and 1.00 ($0.67 \leqq h_{max}/H \leqq 1.0$).

In FIG. 18, the sharp convergence of the "contours" for values of L/H greater than 0.5 demonstrates the effect of the annular portion of the displacement projecting above the wave trough. The result is that the values of maximum variation in mooring force rise sharply as more of the annular displacement projects into the trough of the wave. Therefore, my invention teaches that a best selection of shape parameters is one which maintains the top of the annular, or auxiliary, portion of displacement near or below the trough of the maximum design wave. Mathematically, this teaching is formulated by the bounds established by Inequalities (5) or (6).

Figure 20B:
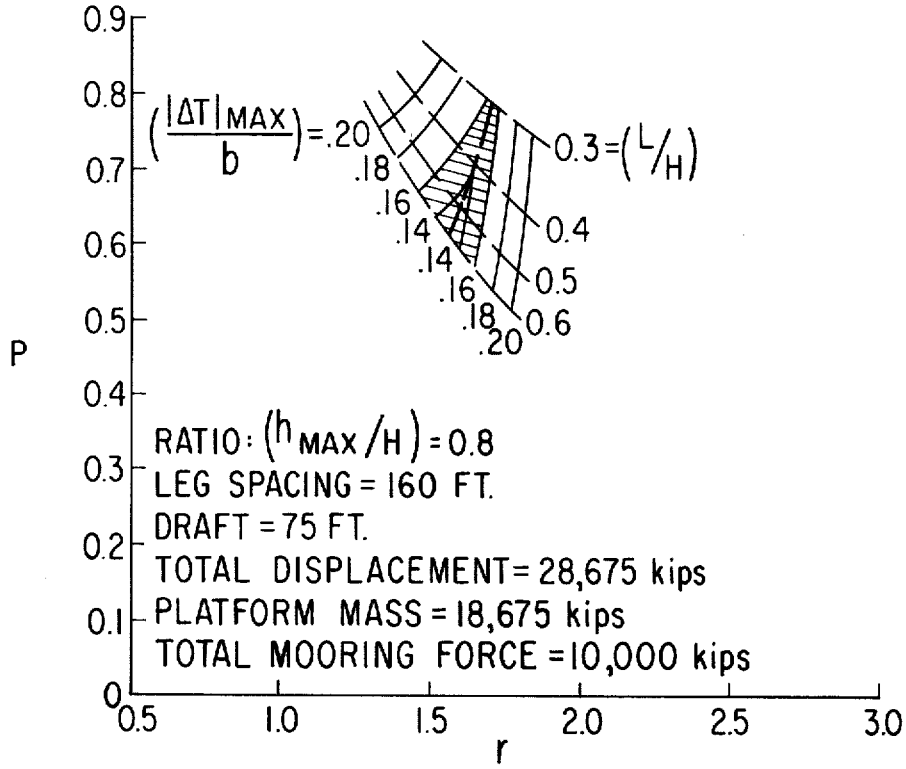
Figure 20A:
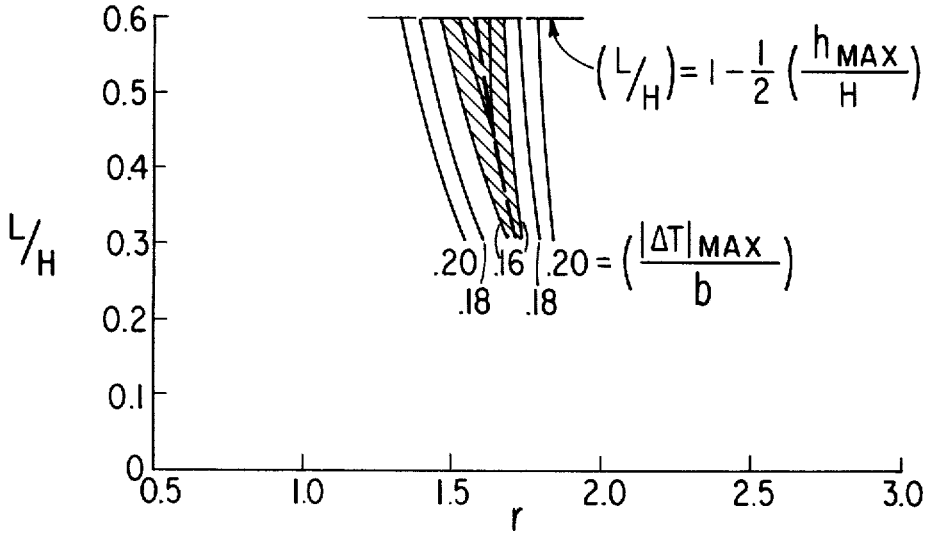
Figure 21B:
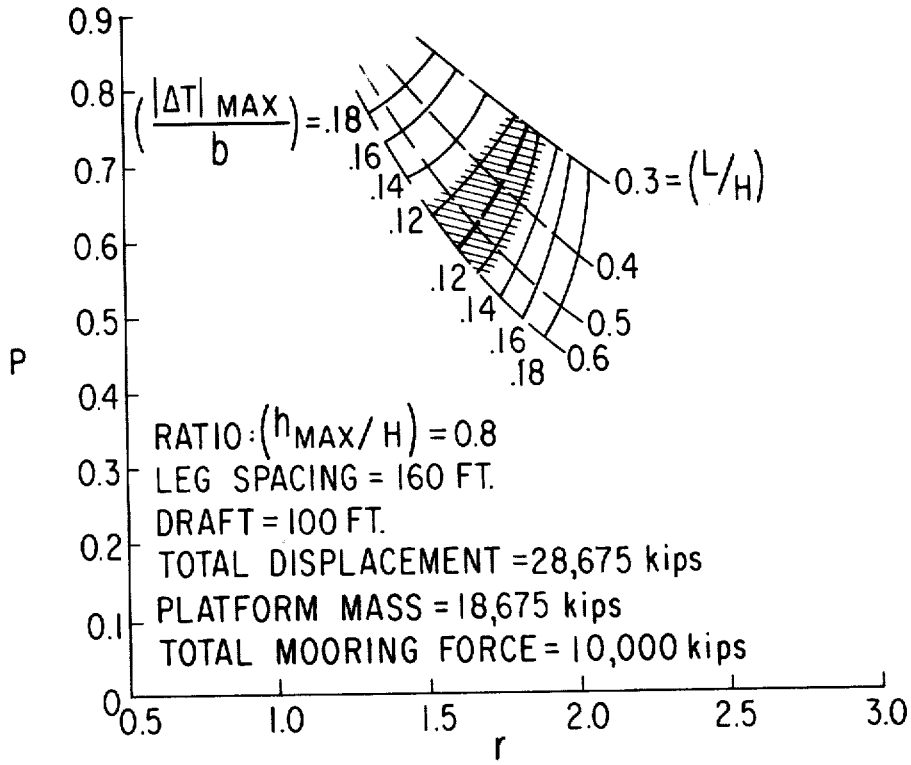
Figure 21A:
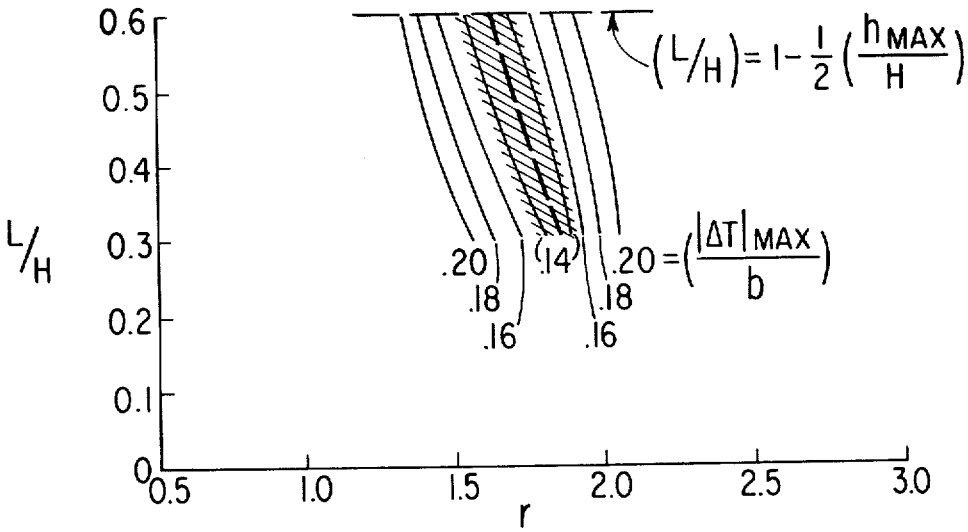

Whereas I have taught that the best selection of draft for a given maximum design wave should be determined from the ratio ($h_{max}/H) \cong 0.8$, it is also instructive to look at the influence of varying draft for constant values of this ratio. FIGS. 20 and 21 demonstrate the values of maximum variation of mooring force for other maximum design waves, 60 feet and 80 feet, and corresponding draft, 75 feet and 100 feet, respectively. In each case the leg spacing displacement and platform mass is the same as in FIG. 15. Also, the ratio of maximum design wave height to draft is the same in every case ($h_{max}$/H0.8).

Comparison of FIGS. 20, 21, and 15 shows the influence of varying draft for fixed ratios of ($h_{max}$/H). The effect of smaller draft is to alter the position of the heavy, dashed line and the shaded region, which correspond to the best combination of shape parameters and the most practical range of shape parameters, respectively. More importantly such a comparison shows that the lowest attainable value of maximum variation in mooring force is not altered significantly by so large a variation in draft; in the three examples the value is about 12.1 to 13.5 percent. This observation strengthens my earlier teaching that the best ratio of maximum design wave height to draft is about 0.8 ($h_{max}/H \cong 0.8$), independently of the value of either draft or maximum design wave height. However, the density of the lines in FIG. 20 indicates for so small a draft (or more exactly, for so large a displacement for the given draft) that the values of maximum variation in mooring force are very sensitive to the selection of the shape parameters.

As an example, my invention teaches for a platform with the following properties:

1. Ratio: $h_{max}/H=0.8$
2. Total Displacement = 28,675 kips
3. Platform Mass = 18,675 kips
4. Total Still Water Mooring Force = 10,000 kips and for a 75-foot draft that the most practical combination of shape parameters are those falling in the shaded region of FIG. 20 and that the best selection of shape parameters are those lying on or near the heavy, dashed line in FIG. 20. Also, for a platform with the above list of properties, but a draft of 100 feet, my invention teaches that the most practical combination of shape parameters are those falling into the shaded region of FIG. 21 and that the best selection of shape parameters are those sets lying on or near the heavy, dashed line of FIG. 21. Furthermore, for a platform with the dimensions listed above and for drafts lying between 75 feet and 125 feet, the range of most practical combinations of the shape parameters are found approximately by interpolating between the shaded regions of FIGS. 20, 21 and 15; and the best combination of shape parameters are determined approximately by interpolating between the heavy, dashed lines in FIGS. 20, 21 and 15.

Figure 22B:
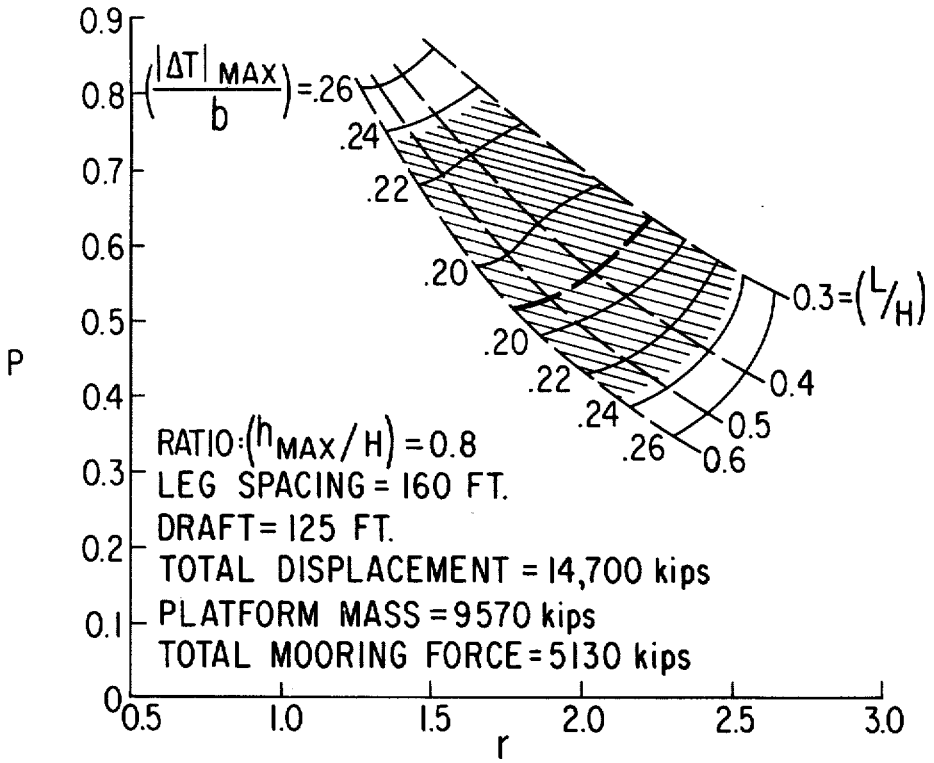
Figure 22A:
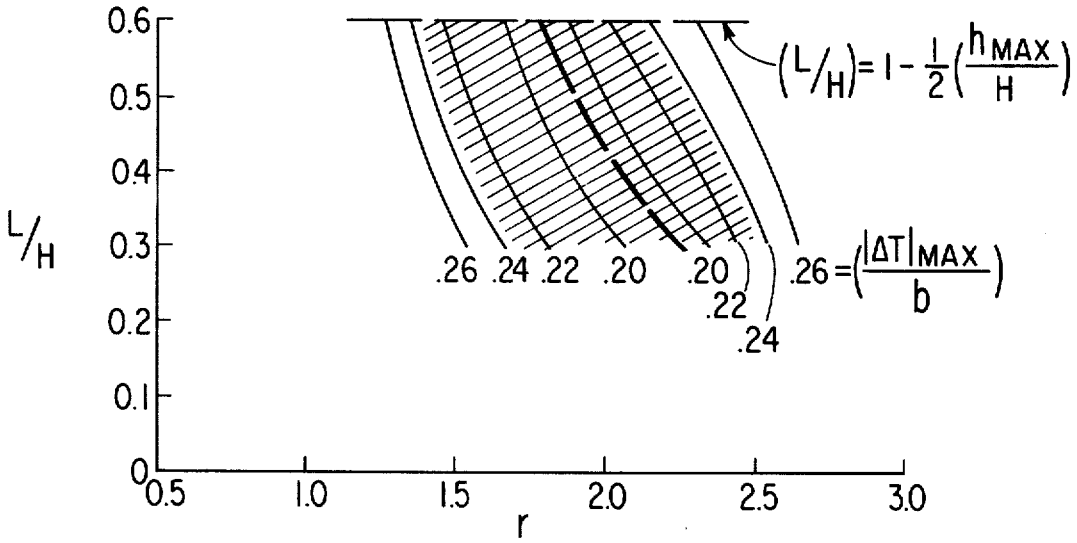
Figure 23B:
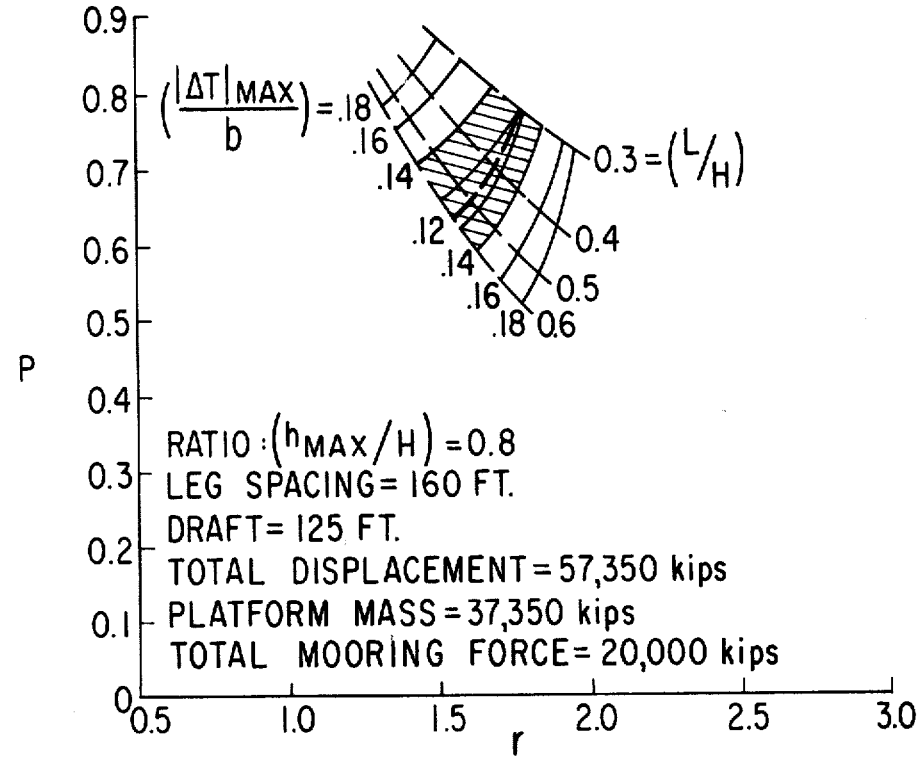
Figure 23A:
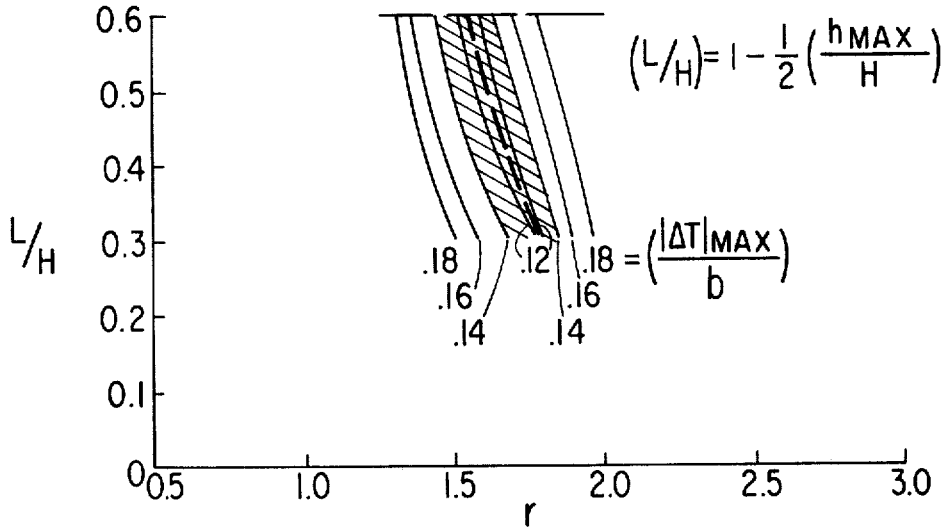

Comparison of FIGS. 22, 15 and 23, in that order, demonstrate the effect of total displacement on maximum variation of mooring force. For each case shown the maximum design wave height is 100 feet, draft is 125 feet and leg spacing is 160 feet. Total displacements are 14,700 kips, 28,675 kips and 57,350 kips, respectively. The ratio (M/B) of platform mass to total displacement is the same in each case. Consequently, two parameters have been varied simultaneously; however, as will be discussed shortly, variation of the platform mass within practical limitations has no significant influence on the values of maximum variation of mooring force. Since the total still water mooring force T is simply the difference between total displacement and platform mass, the ratio (T/B) is also the same in each example. Therefore, in order to express the variation of mooring force as a percent of the still water mooring force, the value of the variation found in the "contour" plots, which is expressed as a percent of displacement per leg, is multiplied by 2.87 (=28,675/10,000) in each of these examples.

As seen by the comparison, changing displacement has a significant influence on selection of the proper shape parameters. Moreover, the lowest attainable value of maximum variation rises with a decrease in displacement, whereas this value does not decrease significantly for an increase in displacement. From examination of several other examples not shown here, it was found that the values of maximum variation rise sharply for displacements less than about 20,000 kips in the case of the specific design properties listed above.

Therefore, my invention teaches for a platform with the following design parameters and dimensions:

1. Ratio: $h_{max}/H=0.8$
2. Draft = 125 feet
3. Ratio: M/B = 18,675/28,675
4. Ratio: T/B = 10,000/28,675 and for a 14,700-kip displacement that the most practical combination of shape parameters are those falling in the shaded region of FIG. 22 and that the best selection of shape parameters are those lying on or near the heavy, dashed line in FIG. 22. Also, for a platform with the above listed properties, but a 57,300-kips displacement, my invention teaches that the most practical combination of shape parameters are those falling into the shaded region of FIG. 23 and that the best selection of shape parameters are those sets lying on or near the heavy, dashed line of FIG. 23. Furthermore, for a platform with the design properties listed above and for displacements lying between 14,700 kips and 57,300 kips, the range of most practical combinations of the shape parameters are found approximately by interpolating between the shaded regions of FIGS. 22, 15 and 23; and the best combinations of shape parameters are determined approximately by interpolating between the heavy, dashed lines in FIGS. 22, 15 and 23.

Several cases, not included herein, have been examined in which platform mass was varied independently of all other parameters. It was observed that such variation of platform mass, within practical limitations, did not significantly alter the range of the most practical combinations of shape parameters in each case, the shaded regions, or the values of the best combination of shape parameters in each case, the heavy, dashed line.

The practical range of platform mass was determined as follows. The platform mass comprises (a) equipment of weight Q such as for drilling or producing, and (b) the structural mass of the platform. From design experience I have observed that the mass of the deck required to provide the necessary support for the equipment of weight Q is approximately Q/4. Also, the mass of the jacket necessary to obtain the required displacement B is approximately B/4. These two observations are sufficiently accurate for a practical range of platform dimensions. Therefore, the total platform mass is the sum of the above three contributions or $$M=Q+Q/4+B/4=(5Q+B)/4 \quad (7)$$

For the purposes of offshore petroleum drilling and production, equipment weights might vary between 4,500 kips and 18,000 kips. Therefore, the bounds on platform mass are a function of the design displacement as follows:

$$5{,}600 \text{ kips}+B/4 \leqq M \leqq 22{,}500 \text{ kips}+B/4 \quad (8)$$

Therefore, for the range of values for displacement which were discussed previously (14,700 kips $\leqq$ B $\leqq$ 57,300 kips), the practical values of platform mass are bounded by the above inequality.

In view of the above description of practical range for platform mass, my invention teaches that the maximum net variation of mooring force, where expressed as a function of displacement per leg, is not significantly influenced by an alteration of the platform mass. However, my invention teaches that the maximum variation of mooring force expressed as a percent of the total mooring force can be decreased by decreasing the platform mass, and consequently, increasing the total mooring force, for a fixed displacement, as demonstrated by the following derivation:

$$\Delta T/T=(\Delta T/B)\cdot B/T=(\Delta T)\cdot/B\cdot B/B-M=(\Delta T)B/(1-M/B) \quad (9)$$

While I have heretofore taught the best selection of shape parameters for only a few of the many examples studied, I now propose to teach a means for determining the best selection of shape parameters for the entire range of each of the parameters which I have discussed. Many examples, not all of which have been included herein, have been studied. These examples were selected from the large range of cases bounded by the limits on the following parameters:

1. Maximum design wave height, 60 ft. $\leqq h_{max} \leqq$ 100 ft.
2. Draft, 75 ft. $\leqq H \leqq$ 150 ft.
3. Leg Spacing, 140 ft. $\leqq A \leqq$ 200 ft.
4. Displacement, 14,700 kips $\leqq B \leqq$ 57,300 kips
5. Platform Mass, see (8) for limits on M
6. Total mooring force, $T=B-M$ Obviously, not all of the possible combinations of these parameters could be examined. However, a sufficient number of examples were studied so that an empirical formulation could be derived, using curve fitting techniques, which will give with suitable approximation the best selection of the shape parameters.

Best Combination of Shape Parameters

Those combinations of shape parameters which give the lowest value of maximum variation of mooring force (those combinations which were defined by the heavy, dashed lines in FIGS. 15 through 23) are defined by the formula $$r_{bt}=1+[C/(L/H)]^n \quad (10)$$

where $$C = (0.4505) - \frac{(29.775')}{H} + \left(\frac{h_{max}}{H}\right)\left[\frac{(4588^k)}{B} - (0.07)\right] + \left(\frac{h_{max}}{H}\right)^2\left[(0.05) - \frac{B}{(573.000^k)}\right] \quad (11)$$

$$n = -(0.088) + \frac{H}{(125')}\left[1 - (0.561)\left(\frac{h_{max}}{H}\right)\right] + \frac{(3928.5^k)}{B} \quad (12)$$

In accordance with my earlier teaching Formula (10) is valid for $$(L/H) \leqq 1-\tfrac{1}{2}(h_{max}/H) \quad (13)$$

Formula (10) gives the best value of r for each value of L as a function of draft H, displacement B and the ratio ($h_{max}/H$) of maximum design wave height to draft. The best value of r for each L is independent of leg spacing A and platform mass M as was taught earlier.

Range of Practical Values

As was noted previously the range of most practical combinations of the shape parameters is arbitrarily defined as containing all sets for which maximum variation in mooring force is within 20 percent of the lowest attainable value of maximum variation for the given draft, displacement, etc. In FIGS. 15 through 23 this range was defined by the shaded regions. Through the use of curve fitting techniques, the range of practical values of r for each value L, may be suitably approximated by $$\left[r_{bt} - \left(0.3441\,\frac{k}{ft^2}\right)\cdot\frac{H^2}{B}\right] \leqq r \leqq \left[r_{bt} + \left(34.41\,\frac{k}{ft}\right)\cdot\frac{H}{B}\right] \quad (14)$$

where $r_{bt}$ is defined by Formula (10).

The empirical Formulas (10) through (14) which define the best or most practical combinations of shape parameters are in terms of r and L, only. The prismatic ratio p corresponding to each combination of r and L, is determined directly from the values of r and L, but depends on the overall bottle configuration. For the general bottle shape associated with my invention (FIG. 7), p is given approximately by $$p = \frac{1}{\left[\frac{(4r^2+2r+23)}{30} + \left(\frac{L}{H} - \frac{3}{10}\right)(r^2-1)\right]} \quad (15)$$

For other practical configurations, the values of p will not be significantly different as long as $R_1$ is always the maximum radius of the bottle, $R_0$ is the bottle radius at still water level and L is the height of the annular, or auxiliary, portion measured from the lowest point on the bottle.

Previously, I taught that the best design draft for a given maximum design wave height is determined by the ratio ($h_{max}/H=0.8$). If this specific value is chosen for the ratio, the best selection of the shape parameters is given by (10) and the most practical range of shape parameters is given by (14), where C and n are determined specifically by $$C = (0.4265) - \frac{(29.775')}{H} + \frac{(3670.4^k)}{B} - \frac{B}{(895{,}310^k)} \quad (16)$$

$$n = -(0.088) + \frac{H}{(226.76')} + \frac{(3928.5^k)}{B} \quad (17)$$

The selection of an exact maximum design wave height is somewhat ambiguous. The simple wave theory employed in this study is approximate, but suitable. There are other wave theories which would render slightly different results for a specific maximum design wave height and platform size. Therefore, it is more practical to speak of a range of shape parameters in which the best selection of shape parameters are contained; but, by this definition, the best combination of parameters is not specified exactly.

Suppose for example that it is impossible to say the ratio ($h_{max}/H$) is exactly 0.8, but the designer is reasonably confident that this ratio is bounded by $$0.75 \leqq h_{max}/H \leqq 0.85. \quad (18)$$

My invention then teaches that the designer is reasonably certain of designing the best configuration if for a given value of L, $r_{bt}$ is bounded by $$r_1 \leqq R_{bt} \leqq r_2 \quad (19)$$

where $$r_1 = 1 + \left[C_1/\left(\frac{L}{H}\right)\right]^{n1} \quad (20)$$

$$C_1 = (0.4261) - \frac{(29.775')}{H} + \frac{(3441^k)}{B} - \frac{B}{(1{,}018{,}670^k)} \quad (21)$$

$$n_1 = -(0.088) + \frac{H}{(215.8')} + \frac{(3928.5^k)}{B} \quad (22)$$

and $$r_2 = 1 + \left[C_2/\left(\frac{L}{H}\right)\right]^{n2} \quad (23)$$

$$C_2 = (0.4271) = \frac{(29.775')}{H} + \frac{(3900^k)}{B} - \frac{B}{(793{,}080^k)} \quad (24)$$

$$n_2 = -(0.088) + \frac{D}{(238.9')} + \frac{(3928.5^k)}{B} \quad (25)$$

Moreover, the range of "most practical" combinations of shape parameters, the shaded regions, becomes the "union" of all regions defined by (14) for all values of ($h_{max}/H$) which are bounded by (18). More specifically, the range of "most practical" values of r for each L is bounded by $$\left[r_1 - \left(0.3441\,\frac{k}{ft^2}\right)\frac{H^2}{B}\right] \leqq r \leqq \left[r_2 + \left(34.41\,\frac{k}{ft}\right)\frac{H}{B}\right] \quad (26)$$

I taught previously that the acceptable or practical range for the ratio $h_{max}/H$ is approximately $$0.65 \leqq (h_{max}/H) \leqq 1.00. \quad (27)$$

For a ratio smaller than 0.65 there would be too much structure for the maximum design wave height, and consequently, the structure becomes unnecessarily expensive. If the ratio is greater than 1.00, there is too small a structure for the maximum design wave height, and consequently, the maximum variation in mooring force becomes untractable. Therefore, my invention teaches the designer that the best selection of draft is such that the ratio ($h_{max}/H$) is bounded as in (27). Under this condition, the best selection of shape parameters is bounded by $$r_3 \leqq r_{bt} \leqq r_4 \quad (28)$$

where $$r_3 = 1 + \left[C_3/\left(\frac{L}{H}\right)\right]^{n3} \quad (29)$$

$$C_3 = (0.4261) - \frac{(29.775')}{H} + \frac{(2982.2^k)}{B} - \frac{B}{(1{,}356{,}200^k)} \quad (30)$$

-continued $$n_3 = -(0.088) + \frac{H}{(196.7')} + \frac{(3928.5^k)}{B} \quad (31)$$

and $$r_4 = 1 + \left[C_4/\left(\frac{L}{H}\right)\right]^{n4} \quad (32)$$

$$C_4 = (0.4305) - \frac{(29.775')}{H} + \frac{(4588^k)}{B} - \frac{B}{(573{,}000^k)} \quad (33)$$

$$n_4 = -(0.088) + \frac{H}{(284.7')} + \frac{(3928.5^k)}{B} \quad (34)$$

My invention teaches the designer that the maximum variation in mooring force is reasonably acceptable if the shape parameters fall within the bounds set forth by (28) through (34) above. However, he must also recognize that the very best design may not have been defined.

The range of "most practical" values of r for each L is bounded by $$\left[r_3 - \left(0.3441\,\frac{k}{ft^2}\right)\frac{H^2}{B}\right] \leqq r \leqq \left[r_4 + \left(34.41\,\frac{k}{ft}\right)\frac{H}{B}\right] \quad (35)$$

This range comprises the union of all combinations of shape parameters which are defined as the most practical combinations by Formulas (10) through (14) for values of ($h_{max}/H$) satisfying (27).

Attention is directed to FIG. 3 which is taken along the line 3—3 of FIG. 1. This shows four vertical float members arranged in a square and connected by cross bracing 34. As can be seen, there is a plurality, in this case four, of riser pipes 28A which extend upwardly through these vertical float members to the deck 12. Derrick 14 supports drilling equipment which is used to drill holes in the bottom of the body of water through these riser pipes 28A. In this system the well head equipment, including blowout preventers, etc., can be located at the surface. From the arrangement of FIG. 3, it is seen that as many as 16 wells can be conveniently drilled from this one structure. After the wells are drilled, the structure can, if desired, remain on location and be used as a production gathering facility.

FIG. 2 illustrates how the upper portion 28A of the riser pipes extends through the lower end member 42 of section 20 of the float. These pipes are rigidly attached, as by welding, to such floats or portions of the structure so that the structure is rigidly connected to the ocean floor by pipes 28A.

The predominating vertical forces acting on a properly designed, vertically moored platform are associated with inertia and acceleration phenomena. In viewing this invention it is illustrative to separate these vertical forces into two categories: namely, variable buoyancy and vertical water acceleration forces. The two categories of forces act in opposite direction, and it is the basic concept of the invention to balance the forces to give as small a variation in mooring force as possible. In achieving the desired balance, it may for some designs be desirable to increase or adjust the acceleration force acting on the platform. Acceleration force can be increased by addition of fins 50. *As indicated in FIG. 1, means 52 is provided to move said horizontal fins 50 about a horizontal axis.* Recognize that acceleration forces are associated with volumes of displaced and therefore accelerated water. The action of the fins is to trap a surrounding "hydrodynamic mass" or volume of water. In this way acceleration forces are increased by opening the fins out to entrap more hydrodynamic mass. On the other hand, when the fins are folded into a vertical position, they do not influence acceleration forces.

Installation of the vertically moored platform might typically be done according to the following steps:

1. Launch, or otherwise remove the baseplate 22 from a transportation barge.

2. Lower the baseplate 22 to the ocean floor by means of guidelines.

3. Using a semisubmersible drilling unit (preferably dynamically positioned) drive marine conductors 24 (e.g. 30 inches in diameter) through the baseplate following subsea drilling practice.

4. Drill out through the marine conductor 24 for 20-inch surface casing.

5. Run 20-inch surface casing string with the lower portion of ball joint 32 at the top of this 20-inch casing string.

6. Cement casing string in the well.

7. Repeat the operation for other conductors and casings installed in the baseplate.

8. Bring platform 10 to the location.

9. Ballast the platform to float at the designed draft.

10. Using, for example, derrick 14, run elongated members 28 in the manner normally employed for installing marine risers, passing the elongated members through vertical conductor pipes down through the platform.

11. Make up ball joint 32 at the bottom of each elongated member 28.

12. Weld off, or otherwise fix, the top of elongated members 28 at the platform deck.

13. Deballast the platform 10 in order to apply the proper tension to the elongated members 28.

While a limited number of embodiments of the present invention have been shown, various modifications can be made thereto without departing from spirit or scope of the invention.

I claim:

1. A floating structure having limited lateral movement for use in a body of water which comprises:

a working deck;

buoyancy means for supporting said working deck, said buoyancy means including a plurality of slender vertical float members;

anchor means in the floor of the body of water;

horizontally spaced-apart, parallel, elongated members interconnecting the said buoyancy means and said anchor means whereby said deck is maintained parallel to and at a substantially constant angle with reference to the horizontal;

each said vertical float member of said buoyancy means having prismatic volume resulting from a straight, vertical, prismatic shape which runs the entire vertical length of the buoyance means, the volume of the prismatic portion comprising between about 40 and80 percent of the total displacement of the buoyancy means, and the structure having an auxiliary buoyancy portion having a volume of displacement between about 20 and about 60 percent of the total displacement of the buoyancy means, said auxiliary volume being placed below the trough of an expected maximum wave;

said platform and buoyancy means being free of any anchoring connection with the water bottom other than said parallel elongated members.

2. A structure as defined in claim 1 in which the volume of the prismatic portion comprises between about 40 and about 60 percent of the total displacement of the buoyancy means.

3. A structure as defined in claim 1 in which the ratio $h_{max}/H$ is about 0.8 in which $h_{max}$ is the height of an expected maximum wave and H is the still water draft.

4. A structure as defined as claim 3 in which the still water draft is between about 75 feet and about 150 feet.

5. A structure as defined in claim 1 in which the structure is so designed so as to have a still water draft between about 75 feet and about 150 feet.

6. An apparatus as defined in claim 1 including pivotal means connecting the lower ends of said elongated members with said anchor means and additional pivotal means connecting the upper ends of said elongated members with said buoyance means.

7. An apparatus as defined in claim 1 including horizontal fins attached to the lower portion of said buoyancy means.

8. An apparatus as defined in claim 7 including means to move said horizontal fins about a horizontal axis.

9. An apparatus as defined in claim 1 in which said elongated members are tubular members.

10. An apparatus as defined in claim 1 including cross bracing between the vertical float means, said cross bracing being restricted to the areas below the still water line.

11. A floating structure for use in the body of water having an expected maximum wave which comprises:

a deck;

buoyancy means rigidly supporting said deck, said buoyancy means including at least three slender, vertical float members, each such float member having two parts, the first part resulting from a straight, vertical, prismatic shape which runs the entire vertical length of the vertical float member, the volume of the prismatic portion comprising between about 40 and about 80 percent of the total displacement of the vertical float member, and an auxiliary portion exterior said prismatic portion and, comprising between about 20 and about 60 percent of the total displacement of the buoyancy means below still water, said auxiliary portion being placed below the trough of the expected maximum wave;

anchor means at the bottom of said body of water;

an elongated member connecting each said vertical float member and said anchor means, said elongated members being parallel;

said structure being free of any anchoring connection with the water bottom other than said parallel elongated members.

12. A structure as defined in claim 11 in which the volume of the prismatic portion of the vertical float member is between about 45 and 65 percent of the total displacement of the vertical float member and the auxiliary portion exterior of said prismatic portion comprises between about 55 and about 35 percent of the total displacement of the buoyancy means below still water.

13. An apparatus as defined in claim 11 including pivotal means connecting the lower ends of said elongated members with said anchor means and additional pivotal means connecting the upper ends of said elongated members with said buoyancy means.

14. An apparatus as defined in claim 11 in which said elongated members are tubular members.

15. A structure as defined in claim 11 in which the ratio $h_{max}/H$ is about 0.8 in which $h_{max}$ is the expected maximum wave height and H is the still water draft.

16. A structure as defined in claim 11 with a ratio $h_{max}/H$ that is between about 0.65 and about 1.00 where $h_{max}$ is the expected maximum wave height and H is the still water draft.

17. A floating structure for use in a body of water having an expected maximum wave height $h_{max}$ which comprises:

a deck;

buoyancy means rigidly supporting said deck, said buoyancy means providing a total still water displacement B and including at least one slender vertical float member having a still water draft H, comprising two parts, the first part resulting from a straight prismatic shape which runs the entire vertical length of the vertical float member and an auxiliary portion exterior to said prismatic portion having an overall vertical length L, said auxiliary portion being placed below the trough of the expected maximum wave, for which the shape of the slender, vertical float member is defined by a value of r, said parameter r being the ratio of the maximum radius of the auxiliary portion to the radius of the prismatic portion, which value r is Equations (32) through (34);

anchor means at the bottom of said body of water;

elongated member interconnecting each said slender vertical float member and said anchor means, if there is more than one vertical float member, the said elongated members associated therewith are parallel;

said structure being free of any anchoring connection with the water bottom other than said elongated member.

18. A structure as defined in claim 17 in which the ratio ($h_{max}/H$) is about 0.8.

19. A structure as defined in claim 17 in which the ratio $h_{max}/H$ is between about 0.65 and about 1.00.

20. A structure as defined in claim 17 in which said elongated members are tubular members.

21. A structure as defined in claim 17 in which there are at least three slender vertical float members and an elongated member connecting each said slender vertical float member and said anchor means, said elongated members being parallel; said structure being free of any anchoring connecting with the water bottom other than said elongated members.

22. A structure as defined in claim 21 in which the ratio $h_{max}/H$ is between about 0.65 and about 1.00.

23. A structure as defined in claim 22 in which the ratio $h_{max}/H$ is about 0.8.

24. A structure as defined in claim 17 in which r is between about $r_3$ and $r_4$.

25. A floating structure for use in a body of water and having an expected maximum wave height $h_{max}$ which comprises:

a deck;

buoyancy means rigidly supporting said deck, said buoyancy means providing a total still water displacement B and including at least one slender vertical float member, said vertical float member having a still water draft H, comprising two parts, the first part resulting from a straight prismatic shape which runs the entire vertical length of the vertical float member and an auxiliary portion exterior to said prismatic portion having an overall vertical length L, said auxiliary portion being placed below the trough of the expected maximum wave, for which the shape of the slender, vertical float member is defined by a value of r, said parameter r being the ratio of the maximum radius of the auxiliary portion to the radius of the prismatic portion, which value r is between about $[r_1-(0.3341 \text{ kips/ft.}^2)(H^2/B)]$ and about $[r_2+(34.41 \text{ kips/ft.})(H/B)]$ where $r_1$ is determined from equations (20) through (22) and $r_2$ is determined from equations (23) through (25);

anchor means at the bottom of said body of water;

an elongated member interconnecting each said vertical float member and said anchor means, if there is more than one vertical float member, the said elongated members associated therewith are parallel;

said structure being free of any anchoring connection with the water bottom other than said parallel elongated members.

26. An apparatus as defined in claim 25 including pivotal means connecting the lower ends of said elongated members with said anchor means and additional pivotal means connecting the upper ends of said elongated members with said buoyancy means.

27. An apparatus as defined in claim 25 in which said elongated members are tubular members.

28. A structure as defined in claim 25 in which there are at least three slender vertical float members and an elongated member connecting each said slender vertical float members and said anchor means, the said elongated members associated therewith being parallel;

said structure being free of any anchoring connected to the water bottom other than said elongated members.

29. A structure as defined in claim 28 in which the ratio $h_{max}/H$ is between about 0.65 and about 1.00.

30. A structure as defined in claim 29 in which the ratio $h_{max}/H$ is about 0.8.

31. A structure as defined in claim 25 in which the value of r is between about $r_1$ and $r_2$.

32. A floating structure as defined in claim 25 in which the ratio $h_{max}/H$ is between about 0.75 and about 0.85.

33. A structure as defined in claim 32 in which the ratio $h_{max}/H$ is about 0.8.

34. A floating structure for use in a body of water having an expected maximum wave height $h_{max}$ which comprises:

a deck;

buoyancy means rigidly supporting said deck, said buoyancy means providing a total still water displacement B and including at least one slender vertical float member having a still water draft H, each said vertical float member comprising two parts, the first part resulting from a straight prismatic shape which runs the entire vertical length of the vertical float member and an auxiliary portion exterior to said prismatic portion having an overall vertical length L, said auxiliary portion being placed below the trough of the expected maximum design wave, for which the shape of the slender, vertical float member is defined by a value of r, said parameter r being the ratio of the maximum radius of the auxiliary portion of the radius of the prismatic portion, which value r is between about $[r_{bl}-(0.3441 \text{ kips/ft.}^2)(H^2/B)]$ and about $[r_{bt}+(34.41 \text{ kips/ft.})(H/B)]$ where $r_{bt}$ is determined from Equations (10), (16) and (17);

anchor means at the bottom of said body of water;

an elongated member connecting each said vertical float member and said anchor means, said elongated members associated therewith being parallel;

said structure being free of any anchoring connection with the water bottom other that said parallel elongated members.

35. An apparatus as defined in claim 34 including pivotal means connecting the lower ends of said elongated members with said anchor means and additional pivotal means connecting the upper ends of said elongated members with said buoyancy means.

36. A structure as defined in claim 34 in which there are at least three slender vertical float members and an elongated member connecting each said slender vertical float members and said anchor means, the said elongated members associated therewith being parallel;

said structure being free of any anchoring connection to the water bottom other than said elongated members.

37. An apparatus as defined in claim 34 in which said elongated members are tubular members.

38. A structure as defined in claim 34 in which the value of r is equal to $r_{bt}$.

39. A structure as defined in claim 34 wherein said ratio $h_{max}/H$ is about 0.8.

40. A structure as defined in claim 36 in which the ratio $h_{max}H$ is about 0.8.

41. A floating structure for use in a body of water which comprises:

a deck;

buoyancy means rigidly supporting said deck, said buoyancy means providing a total still water displacement between about 15,000,000 pounds and about 60,000,000 pounds and including at least three slender, vertical float members, each such vertical float member having a still water draft between about 75 and about 150 feet and comprising two parts, the first part resulting from a straight, vertical prismatic shape which runs the entire vertical length of the vertical float member and an auxiliary portion exterior to said prismatic portion, said auxiliary portion being placed below the trough of the maximum design wave, for which the shape of the slender, vertical float member is defined by either (a) values of p and r which when plotted as a point falls into the shaded regions of either FIGS. 15B through 23B or falls into shaded regions obtained by a linear interpolation between the shaded regions of these figures, said interpolation being made on the basis of still water displacement and still water draft, or (b) values of (L/H) and r which when plotted as a point falls into the shaded regions of either FIGS. 15A through 23A, or falls into shaded regions obtained by a linear interpolation between the shaded regions of these figures, said interpolation being made on the basis of still waster displaceent and still water draft; anchor means at the bottom of said body of water;

an elongated member interconnecting each said buoyancy means and said anchor means, said elongated members associated therewith being parallel;

said structure being free of any anchoring connection with the water bottom other than said parallel elongated members.

42. An apparatus as defined in claim 41 in which said elongated members are tubular members.

*43. A structure as defined in claim 9 including means for conducting drilling operations through said tubular members to underground formations.*

*44. A structure as defined in claim 9 wherein said anchor means includes piles extending into the floor of said body of water whereby holes can be drilled in said floor through said tubular members.*

*45. A structure as defined in claim 9 including wellhead equipment located at the surface of the body of water.*

*46. A structure as defined in claim 9 wherein said structure is used as a production gathering facility.*

*47. A structure as defined in claim 14 including means for conducting drilling operations through said tubular members to underground formations.*

*48. A structure as defined in claim 14 wherein said anchor means includes piles extending into the floor or said body of water whereby holes can be drilled in said floor through said tubular members.*

*49. A structure as defined in claim 14 including wellhead equipment located at the surface of the body of water.*

*50. A structure as defined in claim 14 wherein said structure is used as a production gathering facility.*

*51. A structure as defined in claim 20 including means for conducting drilling operations through said tubular members to underground formations.*

*52. A structure as defined in claim 20 including wellhead equipment located at the surface of the body of water.*

*53. A structure as defined in claim 20 wherein said structure is used as a production gathering facility.*

*54. A structure as defined in claim 27 including means for conducting drilling operations through said tubular members to underground formations.*

*55. A structure as defined in claim 27 including wellhead equipment located at the surface of the body of water.*

*56. A structure as defined in claim 27 wherein said structure is used as a production gathering facility.*

*57. A structure as defined in claim 37 including means for conducting drilling operations through said tubular members to underground formations.*

*58. A structure as defined in claim 37 including wellhead equipment at the surface of the body of water.*

*59. A structure as defined in claim 37 wherein said structure is used as a production gathering facility.*

*60. A structure as defined in claim 42 including means for conducting drilling operations through said tubular members to underground formations.*

*61. A structure as defined in claim 42 including wellhead equipment located at the surface of the body of water.*

*62. A structure as defined in claim 42 wherein said structure is used as a production gathering facility.*

* * * * *

UNITED STATES PATENT OFFICE
CERTIFICATE OF CORRECTION

PATENT NO. : RE 30590

DATED : April 28, 1981

INVENTOR(S) : Kenneth A. Blenkarn

It is certified that error appears in the above-identified patent and that said Letters Patent are hereby corrected as shown below:

Column 5, Line 44 - "13" should read "18".

Column 6, Line 60 - "v=0" should read "y=0".

Column 9, Line 47 - "$(0.4 \leqq p \geqq 0.6)$" should read "$(0.4 \leqq p \leqq 0.6)$".

Column 10, Line 46 - "subject" should read "subjected".

Column 16, Line 29 - "about" should read "above".

Column 16, Line 42 - "28.675" should read "28,675".

Column 16, Line 60 - after "wave" and before "should" add --height--.

Column 17, Line 2 - "$(h_{max}/HO.8)$" should read "$(h_{max}/HAwx\ 0.8)$".

Column 25, Line 28 - after "is" and before "Equations" add the following:

--between about $[r_3-(0.3441\ \text{kips/ft.}^2)(H^2/B)]$ and about $[r_4+(34.41\ \text{kips/ft.})(H/B)]$ where $r_3$ is determined from Equations (29) through (31) and $r_4$ is determined from --

UNITED STATES PATENT OFFICE
CERTIFICATE OF CORRECTION

PATENT NO. : RE 30590

DATED : April 28, 1981

INVENTOR(S) : Kenneth A. Blenkarn

It is certified that error appears in the above-identified patent and that said Letters Patent are hereby corrected as shown below:

Column 27, Line 56 - after "draft;" and
Column 28, Line 2 - before "anchor" delete the following:

> "or (b) values of (L/H) and r which when plotted as a point falls into the shaded regions of either FIGS. 15A through 23A, or falls into shaded regions obtained by a linear interpolation between the shaded regions of these figures, said interpolation being made on the basis of still waster displaceent and still water draft;"

Column 28, Line 26 - "or" should read "of".

Column 28, Line 51 - after "equipment" and before "at" add --located--.

Signed and Sealed this

First Day of December 1981

[SEAL]

*Attest:*

GERALD J. MOSSINGHOFF

*Attesting Officer*

*Commissioner of Patents and Trademarks*